United States Patent
Zorlular et al.

(10) Patent No.: US 10,721,262 B2
(45) Date of Patent: Jul. 21, 2020

(54) RESOURCE-CENTRIC NETWORK CYBER ATTACK WARNING SYSTEM

(71) Applicant: Palantir Technologies Inc., Palo Alto, CA (US)

(72) Inventors: Cem Zorlular, New York, NY (US); Barrett Brown, Houston, TX (US); Xiao (Raymoond) Tang, Singapore (SG); Alexandra Serenhov, Stockholm (SE); Chuo Hao Yeo, Singapore (SG); Ihar Zalutski, London (GB); Matthew Walsh, New York, NY (US)

(73) Assignee: Palantir Technologies Inc., Palo Alto, CA (US)

(*) Notice: Subject to any disclaimer, the term of this patent is extended or adjusted under 35 U.S.C. 154(b) by 168 days.

(21) Appl. No.: 15/783,512

(22) Filed: Oct. 13, 2017

(65) Prior Publication Data

US 2018/0183827 A1    Jun. 28, 2018

Related U.S. Application Data

(60) Provisional application No. 62/439,712, filed on Dec. 28, 2016.

(51) Int. Cl.
  *H04L 29/06* (2006.01)
  *H04L 12/24* (2006.01)
  *G06F 21/55* (2013.01)

(52) U.S. Cl.
  CPC .......... *H04L 63/1433* (2013.01); *H04L 41/06* (2013.01); *H04L 41/22* (2013.01);
  (Continued)

(58) Field of Classification Search
  CPC ..... H04L 63/1433; H04L 41/06; H04L 41/22; H04L 63/1416; H04L 63/1441; G06F 21/552
  See application file for complete search history.

(56) References Cited

U.S. PATENT DOCUMENTS 5,819,226 A   10/1998   Gopinathan et al.
5,892,900 A   4/1999    Ginter et al.
(Continued)

FOREIGN PATENT DOCUMENTS

CN   101729531   6/2010
CN   102546446   7/2012
(Continued)

OTHER PUBLICATIONS

Official Communication for European Patent Application No. 17209693.5 dated Feb. 13, 2019.
(Continued)

*Primary Examiner* — Joseph P Hirl
*Assistant Examiner* — Stephen T Gundry
(74) *Attorney, Agent, or Firm* — Knobbe Martens Olson & Bear LLP

(57) ABSTRACT

A computer system may generate alerts related to a potential cyber attack an resource of an organization. The computer system may receive activity information associated with activity on a computer network of the organization, access contextual information about the resource, determine, based on the contextual information, select, based at least in part on the contextual information, one or more indicators that are indicative of a cyber attack against the resource to form a second plurality of indicators, and generate, based at least in part on the second plurality of indicators and the contextual information, a risk score, wherein the risk score indicates a probability that the resource is at risk of a cyber attack. In response to the risk score satisfying a threshold value, the computer system may generate an alert. Alerts may be presented using a graphical user interface. Analysts' actions may be tracked for review.

16 Claims, 13 Drawing Sheets

(52) U.S. Cl.
CPC ...... *H04L 63/1416* (2013.01); *H04L 63/1441* (2013.01); *G06F 21/552* (2013.01)

(56) References Cited

U.S. PATENT DOCUMENTS

| | | | |
|---|---|---|---|
| 5,978,475 | A | 11/1999 | Schneier et al. |
| 6,094,643 | A | 7/2000 | Anderson et al. |
| 6,253,203 | B1 | 6/2001 | O'Flaherty et al. |
| 6,430,305 | B1 | 8/2002 | Decker |
| 6,725,240 | B1 | 4/2004 | Asad et al. |
| 6,792,422 | B1 | 9/2004 | Stride et al. |
| 6,807,569 | B1 | 10/2004 | Bhimani et al. |
| 6,820,135 | B1 | 11/2004 | Dingman |
| 6,978,419 | B1 | 12/2005 | Kantrowitz |
| 6,980,984 | B1 | 12/2005 | Huffman et al. |
| 7,017,046 | B2 | 3/2006 | Doyle et al. |
| 7,069,586 | B1 | 6/2006 | Winneg et al. |
| 7,168,039 | B2 | 1/2007 | Bertram |
| 7,225,468 | B2 | 5/2007 | Waisman et al. |
| 7,596,285 | B2 | 9/2009 | Brown et al. |
| 7,617,232 | B2 | 11/2009 | Gabbert et al. |
| 7,756,843 | B1 | 7/2010 | Palmer |
| 7,770,032 | B2 | 8/2010 | Nesta et al. |
| 7,801,871 | B2 | 9/2010 | Gosnell |
| 7,899,796 | B1 | 3/2011 | Borthwick et al. |
| 7,917,376 | B2 | 3/2011 | Bellin et al. |
| 7,941,321 | B2 | 5/2011 | Greenstein et al. |
| 7,962,495 | B2 | 6/2011 | Jain et al. |
| 8,036,971 | B2 | 10/2011 | Aymeloglu et al. |
| 8,046,283 | B2 | 10/2011 | Burns |
| 8,054,756 | B2 | 11/2011 | Chand et al. |
| 8,181,253 | B1 | 5/2012 | Zaitsev et al. |
| 8,190,893 | B2 | 5/2012 | Benson et al. |
| 8,196,184 | B2 | 6/2012 | Amirov et al. |
| 8,214,490 | B1 | 7/2012 | Vos et al. |
| 8,229,902 | B2 | 7/2012 | Vishniac et al. |
| 8,239,668 | B1 | 8/2012 | Chen et al. |
| 8,290,838 | B1 | 10/2012 | Thakur et al. |
| 8,301,904 | B1 | 10/2012 | Gryaznov |
| 8,302,855 | B2 | 11/2012 | Ma et al. |
| 8,312,546 | B2 | 11/2012 | Alme |
| 8,473,454 | B2 | 6/2013 | Evanitsky et al. |
| 8,484,115 | B2 | 7/2013 | Aymeloglu et al. |
| 8,589,273 | B2 | 11/2013 | Creeden et al. |
| 8,600,872 | B1 | 12/2013 | Yan |
| 8,646,080 | B2 | 2/2014 | Williamson et al. |
| 8,666,861 | B2 | 3/2014 | Li et al. |
| 8,683,322 | B1 | 3/2014 | Cooper |
| 8,688,573 | B1 | 4/2014 | Ruknoic et al. |
| 8,726,379 | B1 | 5/2014 | Stiansen et al. |
| 8,744,890 | B1 | 6/2014 | Bernier |
| 8,769,412 | B2 | 7/2014 | Gill et al. |
| 8,782,794 | B2 | 7/2014 | Ramcharran |
| 8,798,354 | B1 | 8/2014 | Bunzel et al. |
| 8,812,960 | B1 | 8/2014 | Sun et al. |
| 8,924,388 | B2 | 12/2014 | Elliot et al. |
| 8,924,389 | B2 | 12/2014 | Elliot et al. |
| 8,931,043 | B2 | 1/2015 | Cooper et al. |
| 8,938,686 | B1 | 1/2015 | Erenrich et al. |
| 8,949,164 | B1 | 2/2015 | Mohler |
| 9,021,260 | B1 | 4/2015 | Falk et al. |
| 9,032,531 | B1 | 5/2015 | Scorvo et al. |
| 9,049,117 | B1 | 6/2015 | Nucci et al. |
| 9,100,428 | B1 | 8/2015 | Visbal |
| 9,129,219 | B1 | 9/2015 | Robertson et al. |
| 9,202,249 | B1* | 12/2015 | Cohen .................. G06F 16/285 |
| 9,335,897 | B2 | 5/2016 | Goldenberg |
| 9,338,013 | B2 | 5/2016 | Castellucci et al. |
| 9,407,652 | B1* | 8/2016 | Kesin .................. G06N 7/005 |
| 9,516,053 | B1* | 12/2016 | Muddu .................. G06N 7/005 |
| 9,906,554 | B2* | 2/2018 | Higbee .................. G06F 16/35 |
| 10,063,654 | B2* | 8/2018 | Kirti .................. H04L 67/306 |
| 10,192,058 | B1* | 1/2019 | Jalil .................. G06F 21/577 |
| 2001/0027424 | A1 | 10/2001 | Torigoe |
| 2002/0065708 | A1 | 5/2002 | Senay et al. |
| 2002/0095360 | A1 | 7/2002 | Joao |
| 2002/0095658 | A1 | 7/2002 | Shulman |
| 2002/0103705 | A1 | 8/2002 | Brady |
| 2002/0112157 | A1 | 8/2002 | Doyle et al. |
| 2002/0147805 | A1 | 10/2002 | Leshem et al. |
| 2003/0126102 | A1 | 7/2003 | Borthwick |
| 2004/0034570 | A1 | 2/2004 | Davis |
| 2004/0111480 | A1 | 6/2004 | Yue |
| 2004/0123139 | A1 | 6/2004 | Aiello et al. |
| 2004/0153418 | A1 | 8/2004 | Hanweck |
| 2004/0236688 | A1 | 11/2004 | Bozeman |
| 2004/0250124 | A1 | 12/2004 | Chesla et al. |
| 2005/0010472 | A1 | 1/2005 | Quatse et al. |
| 2005/0086207 | A1 | 4/2005 | Heuer et al. |
| 2005/0133588 | A1 | 6/2005 | Williams |
| 2005/0149455 | A1 | 7/2005 | Bruesewitz et al. |
| 2005/0154628 | A1 | 7/2005 | Eckart et al. |
| 2005/0154769 | A1 | 7/2005 | Eckart et al. |
| 2005/0157662 | A1 | 7/2005 | Bingham et al. |
| 2005/0229256 | A2 | 10/2005 | Banzhof |
| 2005/0262556 | A1 | 11/2005 | Waisman et al. |
| 2005/0275638 | A1 | 12/2005 | Kolmykov-Zotov et al. |
| 2006/0021050 | A1* | 1/2006 | Cook .................. G06F 21/577 726/25 |
| 2006/0026120 | A1 | 2/2006 | Carolan et al. |
| 2006/0031928 | A1 | 2/2006 | Conley et al. |
| 2006/0069912 | A1 | 3/2006 | Zheng et al. |
| 2006/0143034 | A1 | 6/2006 | Rothermel |
| 2006/0143075 | A1 | 6/2006 | Carr et al. |
| 2006/0143079 | A1 | 6/2006 | Basak et al. |
| 2006/0179003 | A1 | 8/2006 | Steele et al. |
| 2006/0212931 | A1 | 9/2006 | Shull et al. |
| 2006/0218637 | A1 | 9/2006 | Thomas et al. |
| 2006/0265747 | A1 | 11/2006 | Judge |
| 2007/0000999 | A1 | 1/2007 | Kubo et al. |
| 2007/0011304 | A1 | 1/2007 | Error |
| 2007/0038646 | A1 | 2/2007 | Thota |
| 2007/0050777 | A1* | 3/2007 | Hutchinson ......... G06F 11/0709 718/104 |
| 2007/0061259 | A1 | 3/2007 | Zoldi et al. |
| 2007/0106582 | A1 | 5/2007 | Baker et al. |
| 2007/0143851 | A1 | 6/2007 | Nicodemus |
| 2007/0150801 | A1 | 6/2007 | Chidlovskii et al. |
| 2007/0156673 | A1 | 7/2007 | Maga |
| 2007/0185867 | A1 | 8/2007 | Maga |
| 2007/0239606 | A1 | 10/2007 | Eisen |
| 2007/0284433 | A1 | 12/2007 | Domenica et al. |
| 2007/0294766 | A1 | 12/2007 | Mir et al. |
| 2008/0046481 | A1 | 2/2008 | Gould et al. |
| 2008/0069081 | A1 | 3/2008 | Chand et al. |
| 2008/0103798 | A1 | 5/2008 | Domenikos et al. |
| 2008/0103996 | A1 | 5/2008 | Forman et al. |
| 2008/0104407 | A1 | 5/2008 | Horne et al. |
| 2008/0140576 | A1 | 6/2008 | Lewis et al. |
| 2008/0201580 | A1 | 8/2008 | Savitzky et al. |
| 2008/0222038 | A1 | 9/2008 | Eden et al. |
| 2008/0222295 | A1 | 9/2008 | Robinson et al. |
| 2008/0222706 | A1 | 9/2008 | Renaud et al. |
| 2008/0229422 | A1 | 9/2008 | Hudis et al. |
| 2008/0243711 | A1 | 10/2008 | Aymeloglu et al. |
| 2008/0255973 | A1 | 10/2008 | El Wade et al. |
| 2008/0301042 | A1 | 12/2008 | Patzer |
| 2008/0313132 | A1 | 12/2008 | Hao et al. |
| 2009/0018996 | A1 | 1/2009 | Hunt et al. |
| 2009/0076845 | A1 | 3/2009 | Bellin et al. |
| 2009/0094166 | A1 | 4/2009 | Aymeloglu et al. |
| 2009/0103442 | A1 | 4/2009 | Douville |
| 2009/0106178 | A1 | 4/2009 | Chu |
| 2009/0112745 | A1 | 4/2009 | Stefanescu |
| 2009/0125359 | A1 | 5/2009 | Knapic |
| 2009/0125459 | A1 | 5/2009 | Norton et al. |
| 2009/0187546 | A1 | 7/2009 | Whyte et al. |
| 2009/0187548 | A1 | 7/2009 | Ji et al. |
| 2009/0228365 | A1 | 9/2009 | Tomchek et al. |
| 2009/0228701 | A1 | 9/2009 | Lin |
| 2009/0249244 | A1 | 10/2009 | Robinson et al. |
| 2009/0271343 | A1 | 10/2009 | Vaiciulis et al. |
| 2009/0281839 | A1 | 11/2009 | Lynn et al. |
| 2009/0307049 | A1 | 12/2009 | Elliott et al. |

(56) References Cited

U.S. PATENT DOCUMENTS

| | | |
|---|---|---|
| 2009/0313463 A1 | 12/2009 | Pang et al. |
| 2009/0319418 A1 | 12/2009 | Herz |
| 2009/0319891 A1 | 12/2009 | MacKinlay |
| 2009/0328222 A1 | 12/2009 | Helman et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0077481 A1 | 3/2010 | Polyakov et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0114887 A1 | 5/2010 | Conway et al. |
| 2010/0131502 A1 | 5/2010 | Fordham |
| 2010/0161735 A1 | 6/2010 | Sharma |
| 2010/0169192 A1 | 7/2010 | Zoldi et al. |
| 2010/0179831 A1 | 7/2010 | Brown et al. |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2010/0330801 A1 | 12/2010 | Rouh |
| 2011/0004626 A1 | 1/2011 | Naeymi-Rad et al. |
| 2011/0055074 A1 | 3/2011 | Chen et al. |
| 2011/0060910 A1 | 3/2011 | Gormish et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |
| 2011/0131122 A1 | 6/2011 | Griffin et al. |
| 2011/0153384 A1 | 6/2011 | Horne et al. |
| 2011/0173093 A1 | 7/2011 | Psota et al. |
| 2011/0202555 A1 | 8/2011 | Cordover et al. |
| 2011/0208565 A1 | 8/2011 | Ross et al. |
| 2011/0213655 A1 | 9/2011 | Henkin |
| 2011/0218955 A1 | 9/2011 | Tang |
| 2011/0219450 A1 | 9/2011 | McDougal et al. |
| 2011/0225586 A1 | 9/2011 | Bentley et al. |
| 2011/0231305 A1 | 9/2011 | Winters |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0307382 A1 | 12/2011 | Siegel et al. |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0079592 A1 | 3/2012 | Pandrangi |
| 2012/0084117 A1 | 4/2012 | Tavares et al. |
| 2012/0084287 A1 | 4/2012 | Lakshminarayan et al. |
| 2012/0084866 A1 | 4/2012 | Stolfo |
| 2012/0110633 A1 | 5/2012 | An et al. |
| 2012/0110674 A1 | 5/2012 | Belani et al. |
| 2012/0131512 A1 | 5/2012 | Takeuchi et al. |
| 2012/0158585 A1 | 6/2012 | Ganti |
| 2012/0159362 A1 | 6/2012 | Brown et al. |
| 2012/0169593 A1 | 7/2012 | Mak et al. |
| 2012/0173381 A1 | 7/2012 | Smith |
| 2012/0215784 A1 | 8/2012 | King et al. |
| 2012/0218305 A1 | 8/2012 | Patterson et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0254129 A1 | 10/2012 | Wheeler et al. |
| 2012/0278249 A1 | 11/2012 | Duggal et al. |
| 2012/0284791 A1 | 11/2012 | Miller et al. |
| 2012/0323888 A1 | 12/2012 | Osann, Jr. |
| 2012/0330801 A1 | 12/2012 | McDougal et al. |
| 2013/0016106 A1 | 1/2013 | Yip et al. |
| 2013/0019306 A1 | 1/2013 | Lagar-Cavilla et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0097706 A1* | 4/2013 | Titonis .................. G06N 20/00 726/24 |
| 2013/0097709 A1 | 4/2013 | Basavapatna et al. |
| 2013/0104236 A1* | 4/2013 | Ray ..................... H04L 63/1433 726/25 |
| 2013/0110694 A1* | 5/2013 | Acuna-Rohter ....... G06Q 40/00 705/37 |
| 2013/0110746 A1 | 5/2013 | Ahn |
| 2013/0110876 A1 | 5/2013 | Meijer et al. |
| 2013/0139268 A1 | 5/2013 | An et al. |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0238664 A1 | 9/2013 | Hsu et al. |
| 2013/0239217 A1 | 9/2013 | Kindler et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0262328 A1 | 10/2013 | Federgreen |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0012724 A1 | 1/2014 | O'Leary et al. |
| 2014/0012796 A1 | 1/2014 | Petersen et al. |
| 2014/0013451 A1 | 1/2014 | Kulka et al. |
| 2014/0040371 A1 | 2/2014 | Gurevich et al. |
| 2014/0058914 A1 | 2/2014 | Song et al. |
| 2014/0059683 A1 | 2/2014 | Ashley |
| 2014/0068487 A1 | 3/2014 | Steiger et al. |
| 2014/0095363 A1 | 4/2014 | Caldwell |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229422 A1 | 8/2014 | Jain et al. |
| 2014/0229554 A1 | 8/2014 | Grunin et al. |
| 2014/0282977 A1* | 9/2014 | Madhu ................ H04L 63/1483 726/7 |
| 2014/0283107 A1 | 9/2014 | Walton et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0359777 A1* | 12/2014 | Lam ..................... G06F 21/577 726/25 |
| 2014/0366132 A1 | 12/2014 | Stiansen et al. |
| 2015/0039565 A1 | 2/2015 | Lucas |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106379 A1 | 4/2015 | Elliot et al. |
| 2015/0121518 A1* | 4/2015 | Shmueli ............. H04L 63/1425 726/22 |

(56) References Cited

U.S. PATENT DOCUMENTS

| | | | |
|---|---|---|---|
| 2015/0128274 A1 | 5/2015 | Giokas | |
| 2015/0134512 A1 | 5/2015 | Mueller | |
| 2015/0135256 A1 | 5/2015 | Hoy et al. | |
| 2015/0161611 A1 | 6/2015 | Duke et al. | |
| 2015/0163242 A1* | 6/2015 | Laidlaw | G06F 21/552 726/22 |
| 2015/0188715 A1 | 7/2015 | Castelluci et al. | |
| 2015/0188872 A1 | 7/2015 | White | |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2015/0338233 A1 | 11/2015 | Cervelli et al. | |
| 2015/0379413 A1 | 12/2015 | Robertson et al. | |
| 2015/0381649 A1* | 12/2015 | Schultz | H04L 63/1433 726/25 |
| 2016/0004764 A1 | 1/2016 | Chakerian et al. | |
| 2016/0004864 A1 | 1/2016 | Falk et al. | |
| 2016/0021139 A1* | 1/2016 | Stephan | G06F 21/552 726/1 |
| 2016/0028759 A1 | 1/2016 | Visbal | |
| 2016/0088000 A1* | 3/2016 | Siva Kumar | H04L 63/083 726/23 |
| 2016/0099963 A1* | 4/2016 | Mahaffey | H04L 63/145 726/25 |
| 2016/0226905 A1* | 8/2016 | Baikalov | H04L 63/1408 |
| 2017/0140663 A1* | 5/2017 | Sadeh-Koniecpol | G09B 5/00 |
| 2017/0171231 A1 | 6/2017 | Reybok, Jr. et al. | |
| 2017/0223030 A1* | 8/2017 | Merza | H04L 63/1416 |
| 2017/0244730 A1* | 8/2017 | Sancheti | H04L 63/1416 |
| 2017/0251006 A1* | 8/2017 | LaRosa | H04L 63/1425 |
| 2017/0251007 A1* | 8/2017 | Fujisawa | H04L 63/0272 |
| 2017/0251013 A1* | 8/2017 | Kirti | H04L 63/1416 |
| 2017/0324768 A1* | 11/2017 | Crabtree | H04L 63/1441 |
| 2018/0013771 A1* | 1/2018 | Crabtree | H04L 63/1416 |
| 2018/0091528 A1* | 3/2018 | Shahbaz | H04L 63/1416 |
| 2018/0103052 A1* | 4/2018 | Choudhury | G06F 21/566 |
| 2018/0167402 A1* | 6/2018 | Scheidler | G06F 21/552 |
| 2018/0183766 A1* | 6/2018 | Crabtree | H04L 9/3236 |
| 2018/0295154 A1* | 10/2018 | Crabtree | G06N 20/00 |
| 2019/0089725 A1* | 3/2019 | Anachi | G06N 20/00 |
| 2019/0089727 A1* | 3/2019 | Mulchandani | H04L 63/1425 |

FOREIGN PATENT DOCUMENTS

| | | |
|---|---|---|
| CN | 103167093 | 6/2013 |
| CN | 103281301 | 9/2013 |
| CN | 102054015 | 5/2014 |
| DE | 102014204827 | 9/2014 |
| DE | 102014204830 | 9/2014 |
| DE | 102014204834 | 9/2014 |
| EP | 1962222 | 8/2008 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2897051 | 7/2015 |
| EP | 2963578 | 1/2016 |
| EP | 2963595 | 1/2016 |
| EP | 2985974 | 2/2016 |
| EP | 3343868 | 7/2018 |
| NL | 2011642 | 8/2015 |
| WO | WO 2005/010685 | 2/2005 |
| WO | WO 2005/116851 | 12/2005 |

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

Distimo—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Google Analytics Official Website—Web Analytics & Reporting, <http://www.google.com/analytics.index.html> Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

Hua et al., "A Multi-attribute Data Structure with Parallel Bloom Filters for Network Services", HiPC 2006, LNCS 4297, pp. 277-288, 2006.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.

Kontagent Mobile Analytics, <http://www.kontagent.com/> Printed Jul. 18, 2013 in 9 pages.

Localytics—Mobile App Marketing & Analytics, <http://www.localytics.com/> Printed Jul. 18, 2013 in 12 pages.

Manno et al., "Introducing Collaboration in Single-user Applications through the Centralized Control Architecture," 2010, pp. 10.

Mixpanel—Mobile Analytics, <https://mixpanel.com/> Printed Jul. 18, 2013 in 13 pages.

Open Web Analytics (OWA), <http://www.openwebanalytics.com/> Printed Jul. 19, 2013 in 5 pages.

Piwik—Free Web Analytics Software. <http://piwik.org/> Printed Jul. 19, 2013 in18 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Sigrist, et al., "PROSITE, a Protein Domain Database for Functional Characterization and Annotation," Nucleic Acids Research, 2010, vol. 38, pp. D161-D166.

StatCounter—Free Invisible Web Tracker, Hit Counter and Web Stats, <http://statcounter.com/> Printed Jul. 19, 2013 in 17 pages.

TestFlight—Beta Testing on the Fly, <http://testflightapp.com/> Printed Jul. 18, 2013 in 3 pages.

(56) References Cited

OTHER PUBLICATIONS trak.io, <http://trak.io/> printed Jul. 18, 2013 in 3 pages.

UserMetrix, <http://usermetrix.com/android-analytics> printed Jul. 18, 2013 in 3 pages.

Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Wikipedia, "Multimap," Jan. 1, 2013, https://en.wikipedia.org/w/index.php?title-Multimap&oldid=530800748.

Official Communication for European Patent Application No. 17209693.5 dated Feb. 5, 2018.

Baker et al., "The Development of a Common Enumeration of Vulnerabilities and Exposures," Presented at the Second International Workshop on Recent Advances in Intrusion Detection, Sep. 7-9, 1999, pp. 35.

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

U.S. Appl. No. 15/796,529, Context-Aware Network-Based Malicious Activity Warning Systems, filed Oct. 27, 2017.

\* cited by examiner

| Indicator | User Roles | | |
|---|---|---|---|
| | Resource 1 (Stock Trading System) | Resource 2 (Tax Return Database) | Resource 3 (Nuclear Centrifuge Control) |
| Phishing Campaign Against Resource User | 0.28 | 0.45 | 0.45 |
| Failed SSH Logins on Resource | 0.28 | 0.255 | 0.255 |
| Virus Infection of Resource Administrator's Computer | 0.25 | 0.15 | 0.15 |
| Data Exfiltration from Resource | 0.2 | 0.2 | 0.2 |
| Multiple Authentication Failures | 0.175 | 0.01 | 0.15 |
| Previously Escalated Alerts | 0.25 | 0.25 | 0.25 |
| Rogue DHCP Hosts | 0.05 | 0.05 | 0.005 |
| Rogue Wireless Access Points | 1 | 0.015 | 0.5 |

FIG. 4

RESOURCE-CENTRIC NETWORK CYBER ATTACK WARNING SYSTEM

CROSS-REFERENCE TO RELATED APPLICATIONS

This application is claims benefit of U.S. Provisional Patent Application No. 62/439,712, filed Dec. 28, 2016, and titled "RESOURCE-CENTRIC NETWORK CYBER ATTACK WARNING SYSTEM". The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for data integration, analysis, and visualization. More specifically, systems and methods are disclosed that facilitate the generation and presentation of alerts relating to a cyber attack on a resource of an organization. Furthermore, systems and methods are disclosed for the collection and processing of responses from a human analyst to such alerts.

BACKGROUND

Embodiments of the present disclosure generally relate to data processing and visualization.

Strategically important computer resources of an organization ("resources"), such as, for example, trading systems, industrial control systems, confidential databases, or more generally any application providing value to an organization, are continuously exposed to the threat of cyber attacks ("attacks"). Those attacks, if successful, may disrupt business processes, expose confidential data, create substantial liability, and undermine public trust in the organization. Because the perpetrator of a cyber attack can choose from a vast variety of different attack strategies and techniques, cyber attacks can be very difficult to timely detect.

SUMMARY

The systems, methods, and devices described herein each have several aspects, no single one of which is solely responsible for its desirable attributes. Without limiting the scope of this disclosure, several non-limiting features will now be discussed briefly.

As mentioned above, substantial incentives exist for actors, such as organized criminals, foreign intelligence services, or activists, to launch a cyber attack against the resources of an organization. These attacks may be conducted with different goals, such as, for example, stealing confidential information ("exfiltration") or causing damage to the organization. Cyber attackers have different tools and techniques at their disposal, such as, for example, the exploitation of various security vulnerabilities or intentional backdoors in software and hardware components, the use of "phishing" and other "social engineering" techniques to acquire access credentials, and the use of "brute force" cracking techniques to find authentication credentials for resources of interest. While many of such attack techniques leave behind some type of indicator that could be used to infer that a cyber attack is or has been in progress, it may be extremely difficult to "connect the dots" and collect and appropriately interpret those indicators.

Because of the different types of potential techniques and strategies available to the perpetrator of a cyber attack, a great variety of different types of records and information may be indicators of a cyber attack. For example, a user's activity records on a computer network may contain indicators of certain types of cyber attacks. Various types of records and logs may contain indicators of a cyber attack. For example, firewall logs, authentication records, Virtual Private Network (VPN) connection records, database server records, etc., may contain indicators of various types of cyber attacks. An indicator may include any data, information, or things, such as an activity, an event from an operating system event log, an access history and/or the like.

Faced with constraints imposed by limited resources for auditing an organization's computer resources for cyber attacks, it may be desirable to focus the auditing process on computer resources of particular business or strategic importance for the organization. Those particularly important computer resources are referred to herein as resources. Such resources may include, for example, a trading system, a database of confidential information such as tax returns, a database of confidential health information, or a control system for an important industrial process or a piece of equipment such as, for example, a centrifuge. Because of the high value of such resources, they may present prime targets for different types of attackers. Advantageously, centering an analysis of indicators of a potential cyber attack around the resource potentially being attacked may provide a way of associating, grouping and reconciling different events by determining that those different events may be directed against a common resource.

A cyber attack against a resource may comprise multiple steps that each involves specific techniques and strategies. For example, a cyber attack may use a particular technique, such as exploitation of a software vulnerability in a web server, to gain access to an internal company network, then use stolen authentication credentials to access the resource, copy data off the resource, and transmit the data out of the organization's network through an encrypted connection. Each of these different steps and techniques may create unique indicators; as such, the full extent of activity of a cyber attack may only be recognized when multiple such different indicators are reviewed and brought into context.

An indicator, viewed in isolation, does not necessarily confirm or deny that a cyber attack is or is not being perpetrated; rather, an indicator may be probative, even if only slightly so, by virtue of being positively or negatively correlated with a cyber attack. For example, an authentication failure on a corporate server, viewed in isolation, may not justify a conclusion that a resource to which this server belongs is being attacked. Viewed together with other indicators, however, knowledge of the fact that there was an authentication failure may assist in determining whether or not a cyber attack is taking place.

As discussed, various types of information ("indicators") can assist in deducing that an attack is in progress. For example, an unusual number of failed authentications on a server of the organization may be indicative of an attacker seeking to gain unauthorized access to that server. Similarly, the presence of malicious software ("malware") on one of the organization's computers, suspicious network traffic, or other factors may be indicative of an attack in progress. Relevant indicators may be collected on different devices on a network, and may be used to enable a comprehensive analysis of a potential cyber attack on a resource. When reviewing such indicators, an analyst may be able to deduce that an attack on an organization's resource is in progress. In many instances, it may be that no single indicator is available that conclusively establishes whether or not a cyber attack is in progress. As such, it may be advantageous to review multiple indicators in context to make this determination. Because these indicators may be present in a large number of different systems that may need to be queried using different protocols and techniques, and the indicators received may be present in different formats and structures, collecting and aggregating the indicators to facilitate a comprehensive review poses unique challenges. It will be appreciated that an auditor who is relieved by an automated system from the tenuous task of gathering, converting, and aggregating indicators will be more efficient in reviewing the information contained therein, and real-time monitoring and detection of cyber attacks may be enabled by such automated systems.

Even with all indicators available for review, it may still be hard to distinguish a cyber attack from regular activity occurring in the course of business of an organization. Because of the large number of different tools and techniques available to an attacker, it is difficult to infer that a cyber attack is ongoing by exclusively looking at one or a limited number of indicators. For example, failed authentication attempts to an organization's servers may indicate the presence of an attacker seeking to "brute force" his way into the server, but such failed authentication attempts may also indicate that a legitimate user has simply forgotten their password.

It is additionally desirable for an organization to detect a cyber attack as early as possible, so that countermeasures may be taken before the attacker's goal may be accomplished.

For the foregoing, and for other reasons, there remains a need for novel systems and methods assisting with identifying a cyber attack against an organization's resources in an early stage while not unduly alerting to activity that is not related to a cyber attack, for presenting alerts related to a suspected cyber attack activity in a way that is comprehensible and accessible to a human analyst, and for collecting and processing responses from a human analyst to such alerts in order to facilitate timely and effective countermeasure against suspected cyber attacks and inform future investigations of suspected cyber attacks.

As described herein, embodiments of the system of the present disclosure may, in some instances, combine sets of more than one indicator using a variety of operations to form one or more new indicators. Such combinations are referred to herein as aggregates. Some aggregates are, for example, counts (tallies), averages, medians, maxima, minima, quartiles, percentages, cross-correlation etc. It may be advantageous to calculate such aggregates for various reasons, including, for example, to reduce the amount of data processed and thus reduce the computational effort required, or to synergistically combine indicators to reveal additional information.

In some embodiments, the warning system may utilize indicators, or combinations of indicators, to detect "lateral movement" of a user. This refers to the phenomenon of a user or device presenting authentication credentials corresponding to more than one user. Such lateral movement may be indicative of a cyber attack. In an example embodiment, the warning system tracks lateral movement by reviewing indicators reflecting authentication attempts, and creating, from those authentication attempts, a tally of how many different users one user or device has attempted to authenticate as.

Systems are known that collect and display one or more types of indicators to a human analyst. Yet these systems may achieve limited success in facilitating the timely detection of attacks, partly because the number of possible indicators of an attack in progress may be extremely large when compared to a human analyst's capacity to review them. Additionally, the meaningful interpretation of indicators is made difficult by the failure of these existing systems to provide appropriate contextual information, such as, for example, other indicators and historical information. Furthermore, reviewing becomes easier and more effective when indicators are presented using graphical representations such as charts and graphs, and aggregate values such as totals, averages and extreme values. Some existing systems fail to adequately digest the indicators and present pertinent information in an easily accessible form. Thus, there remains a need to group, sort, aggregate, and filter the data contained in these indicators, and to present it together with relevant contextual information, in a way that allows a human analyst to review it effectively.

Additionally, it may be difficult, especially for a non-technical user, such as the CEO or a director of an organization, to determine the overall security posture of an organization's resources, in part because the amount and specificity of the information presented may not permit the user to easily draw a summarizing conclusion. This may leave an organization's leaders unable to adequately determine the exposure to risk of some of its most important resources. As such, there is a need for a summarizing indication of an individual resource's security posture, or an organization's overall security posture, that comprises a variety of indicators, but is still easily comprehensible even to a person without training in computer security.

Certain embodiments of the present disclosure may provide a risk score, or a graphical representation of such risk score, for individual resources, as well as for the organization as a whole (e.g., a "global" risk score). The risk score of each resource may be determined by combining the risk estimates for each event and alert associated with the resource. The global risk score may be determined by combining the risk score of all resources. It may be advantageous to provide a risk score that continuously rises as the number of risky events and/or alerts rise, but does not go past a certain number. Such a risk score may be more immediately comprehensible to a user because it can be scaled to a convenient range, such as 0-100. It may also be seen as reflecting the fact that for a number of non-correlated events, representing attempts of a cyber attack against a resource, the risk (e.g., the probability of at least one successful attempt of a cyber attack) monotonically increases with the number of independent attempts, but will never exceed certainty. The combination of constituent risk estimates to form a risk score may thus advantageously be done by using a continuous mathematical function monotonically converging to a desired limit. For example, if $R1$, $R2$ and $R3$ represent the constituent risk estimates (for example, the risk score of three individual resource), the function to calculate $R(R1,R2,R3)$ may be defined as $R(R1,R2,R3)=\arc\tan(R1+R2+R3)*100*2/\text{Pi}$. This ensures that the risk score continuously increases when its constituents increase, but never exceeds 100.

Different resources in an organization may be accessed by different types of users in different roles and may serve different economic functions. As such, it may be advantageous for a warning system to sort, group, filter, score, and categorize alerts of a potential cyber attack by resource. In an example embodiment, the warning system may determine an estimate of how much at risk a given resource is from a cyber attack at a given point in time based on the indicators received. Additionally, if the warning system receives indicators from multiple sources, all indicating a cyber attack against the same resource, presenting those indicators to the analyst together may serve the analyst in determining that there is a cyber attack in progress against a given resource. Advantageously, this may allow for various indicators, including those corresponding to user activity that may not be sufficiently suspicious when reviewed by an analyst individually, to be related to each other and linked to an ongoing cyber attack against a resource. For example, if the administrator of an resource falls victim to a social engineering scam and a short period of time later multiple transactions are made from the resource that appear to be just below the threshold for which the administrator would have to seek internal approval, these two indicators when reviewed individually may not be sufficient for an analyst to commence closer scrutiny. If, however, these two indicators are presented to the analyst together, the analyst may be able to determine that a cyber attack against this resource is in progress and take appropriate action.

Embodiments of the present disclosure relate to a warning system that may automatically collect indicators, automatically analyze those indicators to generate alerts, automatically tag, score and group those alerts, and provide results of the automated analysis, tagging and grouping in an optimized way to an analyst. The automated analysis of the indicators may include an automated application of various criteria or rules so as to generate a visual display of the groups of related indicators so that the analyst may quickly and efficiently evaluate the alerts. In particular, the indicators may be dynamically re-grouped and/or filtered in an interactive user interface so as to enable an analyst to quickly navigate among information associated with various alerts and efficiently evaluate the groups of alerts in the context of, for example, an audit for data breach or other activity related to a cyber attack against a resource. Embodiments of the present disclosure also relate to automated scoring of the alerts. The interactive user interface may be updated based on the scoring, directing the human analyst to certain alerts (for example, alerts more likely to be associated with activity related to a cyber attack against a resource) in response to the analyst's inputs. Embodiments of the present disclosure also related to automated updating of the scoring method based on past findings. For example, if an analyst determines that an alert generated on the basis of a certain indicators was a false positive, the influence of these indicators in the alert scoring process may be reduced for future alert scoring. Conversely, if an analyst determines that an alert was issued that indeed should have been issued, the influence of the indicators present in the alert in the alert scoring process may be increased for future alert scoring. Risk scores may be continuously updated to reflect new information, such as provided from the auditor in response to alerts or events or as new indicators are received or new alerts and events are generated.

In an example embodiment, interpretation of the indicators may take place in several steps. First, one or more indicators may be interpreted by the warning system as belonging to a single event. For example, if a connection is made from an email client to an email server for the client to send an email message, corresponding indicators reflecting the successful connection may appear in both the client and the server logs, both indicating that the connection was made. Upon processing these indicators, the warning system may determine that an event, namely an email being sent, had occurred, and may assign various attributes and properties to the event, such as, for example, the time and date of the occurrence of the event, and the users, IP addresses, computers, servers or other actors involved. An event may or may not be indicative of any risk to a resource. The event may then be analyzed as to the estimated risk it poses to the resource. Often, the event will be deemed substantially irrelevant and thus not affect the resource's exposure to risk; as such, the warning system will not request a response from an analyst related to the alert. It will, nevertheless, still record the event as it may prove to be relevant contextual data for investigations of cyber attacks related to the resource. In some instances, the event will be determined to be indicative of risk to the resource; in these cases, the warning system may designate the event as an alert and request an analyst's response.

An analyst's effectiveness in detecting activity related to a cyber attack against a resource and evaluating alerts may be greatly enhanced if the analyst is presented with indicators that are contextually related to the activity being audited, or the alert being evaluated. In an example application, an analyst may be tasked with deciding whether the presence of a certain indicator represents activity related to a cyber attack against a resource. However, an individual indicator oftentimes includes insufficient information for the analyst to make such decisions. Rather, the analyst may make better decisions based upon a collection of related indicators. For example, a user entering unusually large transactions into a financial transaction system, or a phishing attack against a user may, by themselves, not be sufficiently probative for an analyst to assume that a cyber attack is in progress. Conversely, if the analyst is able to see that the same user who has been receiving phishing emails has been entering unusually large transactions, the analyst may see a pattern of activity that correlates more strongly with a cyber attack.

An analyst's effectiveness in detecting cyber attacks and evaluating alerts may further be enhanced by the analyst being presented with aggregates, such as totals, counts and averages, calculated from several indicators. For example, an analyst reviewing whether a certain user's act of e-mailing confidential documents to the user's private email account represents activity related to a cyber attack against a resource may make better decisions when presented with information regarding prior, similar activity by the user, the user's department or the user's organization.

Additionally, an analyst typically does not have the time and resources to review all activity by all users. As such, it is advantageous that auditing resources may be concentrated on the activities most likely to constitute activity related to a cyber attack against a resource. Some embodiments of the present disclosure perform scoring based on an estimate of the likelihood that a certain alert is related to activity related to a cyber attack against a resource to decide whether to present an alert to an analyst, and how to present the alert. The scoring is based on a mapping between each indicator and an estimate of the likelihood that the indicator is indicative of activity related to a cyber attack against a resource. Such a mapping is referred to as the "weight" of the corresponding indicator.

The types of activity that are or are not associated with a cyber attack, and relevance of different indicators, may change over time, and may not be known accurately. For example, novel attack techniques may be developed by attackers, and the configuration of resources may change so as to change their vulnerability profile. As such, in some embodiments, the warning system updates the weights of indicators to reflect an analyst's determination as to whether or not the issuance of a given alert was justified. For example, in an embodiment, if an analyst determines that a given alert was issued despite the absence of activity related to a cyber attack against an resource, the weights associated with the indicators based on which the alert was issued will be reduced. This allows the warning system to learn from past alerts, improving its prediction accuracy over time. To ensure that the warning system does not unduly filter out emerging patterns indicative of a cyber attack for which the existing weights are not optimal, and thus helps prevent the warning system from becoming error-prone due to self-reinforcement bias, a random offset value may be added or other random (including pseudo-random) or non-deterministic adjustment made during the filtering process to introduce an element of chance into the warning system's decision of whether an alert is displayed or not. Similarly, in another implementation, alerts with various scores may be randomly (including pseudo-randomly) displayed to the user for the same purposes.

Some currently available systems allow the analyst to search for and review individual indicators. Although these currently available systems can be helpful in discovering indicators for known types of activity related to a cyber attack, they typically require the analyst to manually repeat the same series of searches to determine related indicators, to manually calculate aggregates where the analyst desires to use them, and to manually go through large amounts of irrelevant data to find relevant indicators contained therein. Performing and continuously repeating these manual processes consumes time and resources, such that there are oftentimes more investigations than can be performed.

In contrast with these currently available systems, and as described above, according to various embodiments, the warning system of the present disclosure automatically collects indicators from a variety of sources, analyzes the indicators to generate alerts, tags and groups the alerts, and generates an interactive user interface in which, in response to inputs from the analyst, information related to the alerts and relevant indicators may be efficiently provided to the analyst. Accordingly, the analyst may be enabled to efficiently evaluate the alerts.

Additionally, the automated scoring of alerts (as mentioned above) may enable highly efficient evaluation of the most relevant alerts by an analyst. For example, the interactive user interface is generated so as to enable an analyst to quickly view critical groups of alerts (as determined by the automated scoring), and then in response to analyst inputs, view and interact with the generated information (including, for example, time-based charts and/or other information) associated with the alerts. In response to user inputs the user interface may be updated to display raw data associated with each of the generated alerts and its corresponding indicators if the analyst desires to dive deeper into data associated with a given alert.

In some embodiments, the warning system may record activities by the analysts, so as to allow for subsequent auditing of the auditing process, or of individual analysts. For example, the warning system may store each item of information presented to an analyst, and each action taken by an analyst, for example each alert response, in an audit database so that it is possible to determine which analyst was presented with what information, and what the analyst's response was. Advantageously, this may allow the organization to retroactively determine responsibilities as to an analyst's decision to take action on an alert, and thus improves accountability and confidence.

In some embodiments, the warning system allows an analyst to respond to an alert in various ways. For example, the warning system may allow the analyst to respond to an alert by "signing off" on the alert, thus determining that the resource is not being put at risk by the activity related to the alert. Alternatively, the analyst may initiate an investigation by another analyst into the alert and related events. The analyst may also choose to escalate the alert, thus notifying supervisors that action needs to be taken to prevent a cyber attack. The analyst may also submit comments to the alert, which may then be shown when the alert is subsequently presented. Advantageously, this allows for more effective information-sharing and collaboration between analysts and analysts from duplicating each other's work.

Further, as described herein, a warning system may be configured and/or designed to generate user interface data useable for rendering the various interactive user interfaces described. The user interface data may be used by the warning system, and/or another computer system, device, and/or software program (for example, a browser program), to render the interactive user interfaces. The interactive user interfaces may be displayed on, for example, electronic displays (including, for example, touch-enabled displays).

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst using the warning system.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of indicators), automatic and dynamic execution of complex processes in response to the input delivery (for example, grouping, filtering and scoring of alerts), automatic interaction among various components and processes of the warning system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of potentially activity related to a cyber attack against a resource of various types. An analyst may be able to start an investigation by responding to alerts generated by the warning system that are generated based on an empirically determined estimate of likelihood of activity related to a cyber attack against an resource. This may focus the analyst's attention on reviewing activity that has historically proven to be problematic. As such, it may reduce the amount of time and effort required to perform the investigation. The disclosed techniques may also, according to various embodiments, provide a prioritization of multiple alerts related to activity related to a potential cyber attack, dynamic re-grouping of such alerts, and alert filtering. For example, the analyst may also be able to start the investigation from a high priority group of alerts, which may allow the analyst to focus on the most important investigations, and may quickly evaluate that group of alerts based on the efficient user interface generated by the warning system. In each case, the time requirements of such an investigation may be significantly reduced due to the creation and use of highly efficient representations, including visual representations such as graphs, and aggregate quantities, such as totals, counts, and averages, of related indicators.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 4 illustrates an example weight table, according to an embodiment of the present disclosure.

DETAILED DESCRIPTION

Figure 1A:
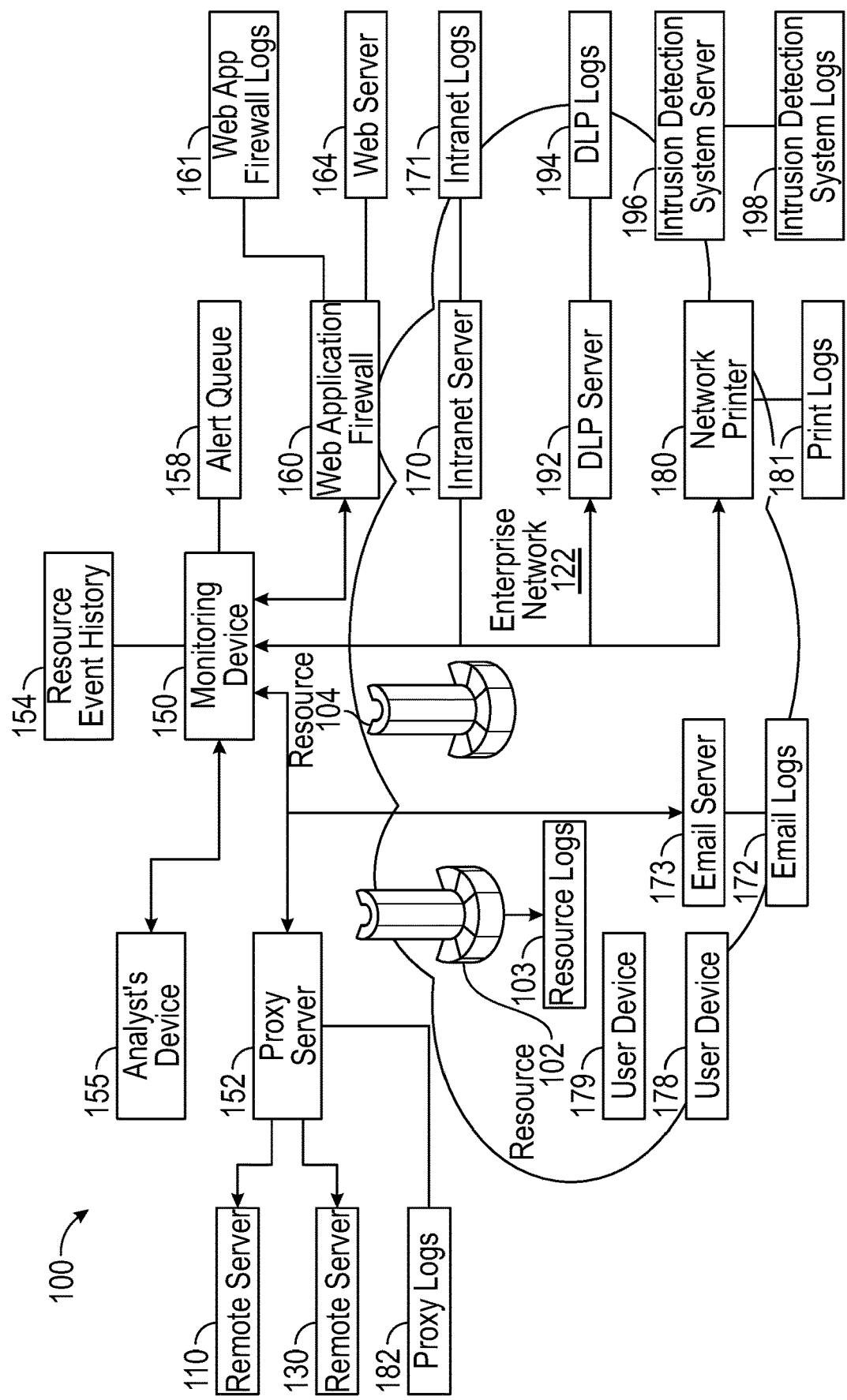
FIG. 1A is a block diagram illustrating an example cyber attack warning system in an example operating environment, according to an embodiment of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Cyber attack: The attempt to gain access to an organization's computer resources by unauthorized means or in an unauthorized manner. A cyber attack may involve techniques such as exploitation of software or hardware vulnerabilities, social engineering such as "phishing", using stolen authentication information, etc.

Resource: A computer-based resource or system of an organization of particular importance. For example, a resource may be a trading system, an industrial control system, a confidential database, and/or any other computer system or resource or the like. Resources may comprise multiple servers, databases, or computers.

Contextual information: Any information about a resource and its environment, such as the resource's access policy, the resource's value, the resource's physical location, or the resource's location in the organization's network topology.

Indicator: Any information that indicates a cyber attack against a resource is more or less likely. Such indicators may include, for example, computer logins and logouts, data sent and received on an organization's network, data transferred to or from a database, data changed or modified by a user, failed or successful user authentications, failed or successful attempts at exploiting a security vulnerability in a computer resource of the organization, failed or successful attempts at "phishing", failed or successful attempts to install malicious software, or "malware", on an organization's computers, etc. Such indicators may be gathered by hardware appliances or computing devices located within a network or computing system, software applications located within a network or computing system, and/or any other suitable methods. For example, indicators may be obtained from in proxy logs, data loss prevention (DLP) logs, firewall logs, VPN logs, operating system logs such as syslog or Windows Event Log, etc.

Phishing: Stealing authentication information of a user by defrauding the user into voluntarily giving up the information. For example, a common phishing attack may comprise sending an email to a user that falsely purports to be sent by the organization's IT department to a user and requests a user's password.

Event: An occurrence that is potentially related to a cyber attack on a resource. For example, a phishing email sent to a user of a resource, or a failed or successful login attempt by a user on a server related to a resource, or a transaction on a resource may be determined to be events. Events may be associated with a date, time, associated users, associated computers, or other information providing context to the event. Notably, some events may be generated in the ordinary cause of business; as such, an event is not necessarily related to a cyber attack on a resource.

Data exfiltration: Unauthorized removal of information (e.g., confidential information) from the control of the organization. Data exfiltration may be accomplished, for example, by copying confidential information to a removable drive, by uploading confidential information to a web server, by emailing confidential information to a recipient outside the organization, etc.

Alert: A determination from a warning system that a potential cyber attack against a resource was detected.

User activity information: Any information related to a user's activity on a computing system or network. Such user activity information may include, for example, computer logins and logouts, data inputted, data transferred, data changed or modified, data created, data outputted, data printed, IP addresses communicated with, websites communicated with, software applications executed, etc. Such user activity information may be gathered by hardware appliances or computing devices located within a network or computing system, software applications located within a network or computing system, and/or any other suitable methods. For example, user activity information may be stored in proxy logs, data loss prevention (DLP) logs, email logs etc.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Example Warning System and Network Environment

FIG. 1A is a block diagram illustrating an example cyber attack warning system in an operational (e.g., network) environment, according to an embodiment of the present disclosure. As shown in the embodiment of FIG. 1A, the warning system comprises a monitor device 150 connected through an enterprise network with an auditor's device 155, an application firewall 160, an intranet server 170, a data loss prevention server 192, a network printer 180, an email server 173, a proxy server 152 and one or more resources such as resource 102 and resource 104. The monitoring device 150 can use the enterprise network to acquire various indicators. Such indicators include DLP logs from the data loss prevention server 192, application firewall logs 162 from the application firewall 160 protecting a web server 164, intranet logs 171 from the intranet server 170, email logs 172 from the email server 173, proxy logs 182 from the proxy server 152, intrusion detection system logs 198 from an intrusion detection system server 196, etc. The resources 102 and 104 may include, for example, a trading system, a financial transaction system, a database storing confidential information such as a patient database or a control system for an industrial process such as a chemical reactor or a centrifuge. The monitoring device may also be able to access resource logs 103 from the resources 102 and 104. Such resource logs 103 may be specific to the application of the resource, and may comprise, for example, transaction information, trading information, information about which user accessed the resource, from what geographical location or from what computer the user accessed the resource, etc. The activities of the user devices may be logged and recorded at various locations in the enterprise network. For example, the user devices' 178, 179 access to remote servers 110, 130 may be recorded by the proxy server 152 in the proxy logs 182. The user devices 178, 179 may be running Data Loss Prevention (DLP) software that stores and sends to the DLP server information about certain acts potentially in violation of a company's DLP (data loss prevention) policy, such as copying of data onto a removable storage medium. The DLP server may include this information in the DLP logs 194.

The enterprise network 122 may permit for all of these devices, and additional devices not indicated, to exchange information with each other and with outside devices (e.g. internet hosts).

The email server is responsible for routing email messages originating from the enterprise network 122 to their recipients. During operation, the email server creates email logs 172, and makes the email logs 172 available to the monitoring device 150. For example, the email logs 172 may comprise indicators relating to what messages a user sent, who the recipients of these messages were, and what type of data attachments were contained in the message.

A network printer 180 may also be connected to the enterprise network 122. The network printer 180 may create print logs 181 in the course of its operation, and make the print logs 181 available to the monitoring device 150 through the enterprise network 122. The print logs 181 may comprise indicators related to what print jobs were started, which user started each print jobs and from what computer it was sent, how many pages each print job was, and what the type, file name and file type of the printed document was.

A Data Loss Prevention (DLP) server 192 may also be connected to the enterprise network 122. The DLP server may provide DLP logs 194, which may comprise indicators related to a user's transfers of files from the enterprise network 122 to removable media (such as a USB flash drive), the user's transfer of files and/or communications within and/or outside of the enterprise network 122, and/or other user activities. The DLP server may, for example, be any commercially available or open-source DLP solution, including, for example, RSA DLP or McAfee Total Protection DLP.

An intrusion detection system (IDS) server 196 may also be connected to the enterprise network 122. The intrusion detection system may, for example, be any commercially available or open-source IDS solution, including, for example, Snort or Suricata. The intrusion detection system may make available intrusion detection system logs 198, which may comprise indicators related to potential attempts to exploit software or hardware vulnerabilities, network traffic originating from malware, and similar activity which the IDS is monitoring the network for.

The monitoring device 150 may also access logs and other activity information from sources in addition to the ones illustrated here. For example, the monitoring device 150 may access operating system logs of various computer systems, such as are provided by syslog or Windows Event Log. The monitoring device 150 may also access service logs that may be generated by a variety of services, such as a web server, database server, voice over IP server, during operation. The monitoring device 150 may also access logs from various other devices such as manageable switches, Uninterruptible Power Supplies (UPSs), hardware firewalls, wireless access points, etc.

In various embodiments, the warning system may be configured in various ways that differ from the example configuration of FIG. 1. For example, one or more aspects described in reference to FIG. 1 may not be present, and/or additional aspects may be present, in any given implementation of the warning system. Thus, while different types of user activity information and contextual information may be available in different implementations, the warning system described herein may nevertheless function similarly, and all such implementations are contemplated.

Accordingly, as mentioned, in various embodiments the monitoring device is configured to collect and analyze a variety of indicators, and generate alerts based on the result of the analysis. For example, the monitoring device may receive email logs 172, proxy logs 182, DLP logs 194, intranet logs 171, application firewall logs 161, and/or various other indicators.

Figure 1B:
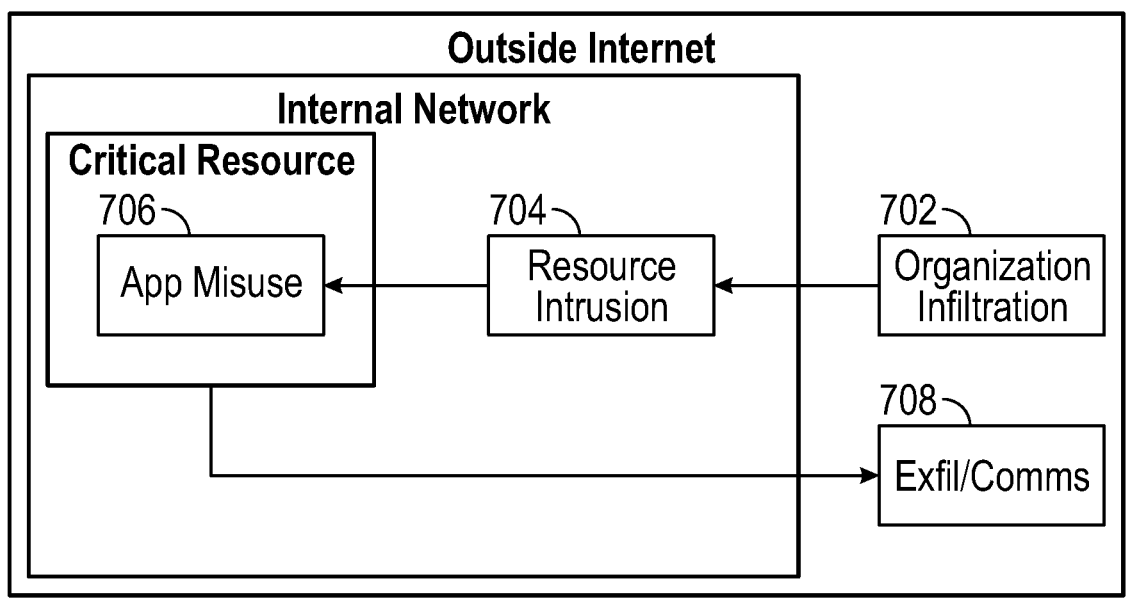
FIG. 1B is a flow chart illustrating a schematic representation illustrating several steps of an example cyber attack.

FIG. 1B shows a schematic representation 700 illustrating several steps of an example cyber attack against a resource of an organization. Block 702 shows a first step of the example cyber attack, indicating organization infiltration. This step comprises the malicious agent infiltrating the organization's electronic network to gain access to internal systems. This step may, for example, be performed by using a stolen laptop to access the corporate network as discussed or by stealing an employee's authentication information by using social engineering or phishing attacks. Block 704 indicates a second step of the example cyber attack of resource intrusion. In this step the attacker accesses the target resource. This may be accomplished, for example, by exploiting a software or hardware vulnerability present in the resource or by using stolen administrative access credentials to access the resource. Block 706 illustrates a third step of the example cyber attack indicating application misuse. In this step the attacker, having acquired access to the resource, now abuses the acquired unauthorized access to the resource to accomplish the goal of his attack. For example, the application misuse may be accomplished by dumping a database containing confidential information into a file or by copying documents containing trade secrets to a removable storage medium. Block 708 indicates a fourth step of the example cyber attack indicating infiltration. Herein the attacker seeks to remove the confidential information acquired in step 3 by exfiltrating it from the corporate network. For example, the attacker may accomplish this step by using an encrypted network tunnel to transfer the stolen information from the corporate network onto a server controlled by the attacker. It will be appreciated that the different steps, as illustrated, involve the attacker interacting with different resources of the organization, and thus causing different types of indicators to be created. It will also be appreciated that an attacker may be able to combine and interchange different attack techniques, thus making it difficult to tie a potential attack to a particular sequence of steps. As such, to understand the entire scope of a cyber attack as illustrated in FIG. 1B, it may be advantageous to not restrict an analysis to any of the constituent steps, but to perform a comprehensive analysis, focused on the resource, of all steps of an attack.

Figure 1C:
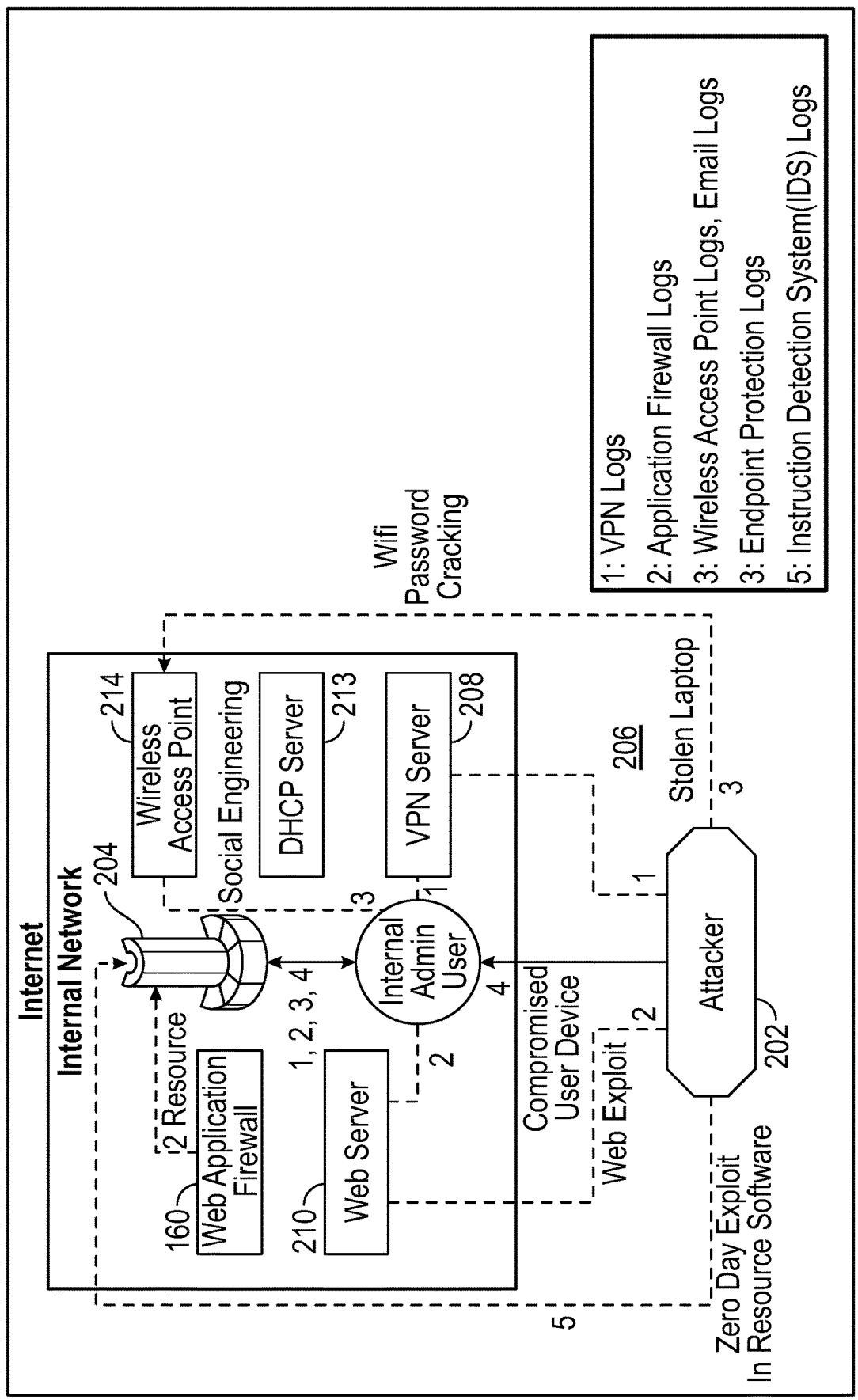
FIG. 1C is a flow chart illustrating a schematic overview of various potential, example cyber attacks against a resource of an organization, and potential strategies for their detection.

FIG. 1C shows a schematic illustration of various examples of potential cyber attacks against an organization's resources. In the example of FIG. 1C, a malicious agent 202 seeks to acquire unauthorized access to the critical resource 204. The malicious agent may, for example, be a foreign intelligence service, an organized criminal group, or an activist. The critical resource 204 may be an application such as a business critical scheduling system or an electronic commerce website. It may also be a server such as, for example, a database server storing confidential information or a communication server running business critical infrastructure. The malicious agent 202, who is seeking to gain access to the resource 204, may seek to accomplish the attack through a diverse variety of technical means, accordingly causing different types of indicators in various systems of the organization to be created.

Some attack approaches may seek to attack the resource by an intermediate step, such as by first attacking another resource, gaining access to an administrative account on that other resource, and then commandeering the administrative account to attack the resource. Other attack approaches may forego such an intermediate step and directly seek to attack the resource. Some of these exemplary attack approaches are illustrated using dashed lines. For example, according to approach 1, the malicious agent 202 may utilize a stolen laptop 206 to access the corporate network through the VPN server. The access to the corporate network by the stolen laptop 206 may, for example, be visible in log files created on the VPN server 208. Alternatively or additionally, the attacker may decide to utilize approach 2, comprising attempts to exploit software or hardware vulnerabilities in web servers or applications of the organization, for example web server 210. Alternatively or additionally, the malicious agent 202 may, as illustrated in approach 3, seek to compromise wireless access point 214, for example, by exploiting cryptographic weaknesses in encryption and authentication schemes uses in the wireless access point 214. The malicious agent 202's attempts to do so may be indicated by logs created in the wireless access point 214, logs of the DHCP server 212, log files created in the web server 210 or the application firewall 160, and/or the like.

Alternatively or additionally, the malicious agent may seek to compromise one or more end points such as employees' laptops, personal computers, mobile phones or other devices, as illustrated in approach 4. The malicious agent 202's attempts at doing so may be indicated in the data loss prevention system logs 213. The malicious agent 202 may also seek to attack the resource directly by utilizing an exploit leveraging a software or hardware vulnerability in the resource itself, as illustrated in approach 5; such an attack may be visible in the logs of an intrusion detection system (IDS). It may be difficult or even impossible to determine that an attach as illustrated in approach 1 has occurred by only reviewing indicators contained in the wireless access logs; conversely, it may be difficult or impossible to determine that an attack as illustrated in approach 3 has occurred by only reviewing indicators contained in wireless access logs. It will be appreciated that when analyzing the risk to an resource by a cyber attack, it may be necessary to detect, and respond to, different strategies and techniques that may be chosen by potential attackers; as such, it may be advantageous to focus the analysis on the resource being attacked, rather than to focus the analysis on the individual indicator related to the attack. For similar reasons, it may also be advantageous to integrate various indicators from a diverse range of sources into a comprehensive analysis.

Example Method of Alert Generation

Figure 2:
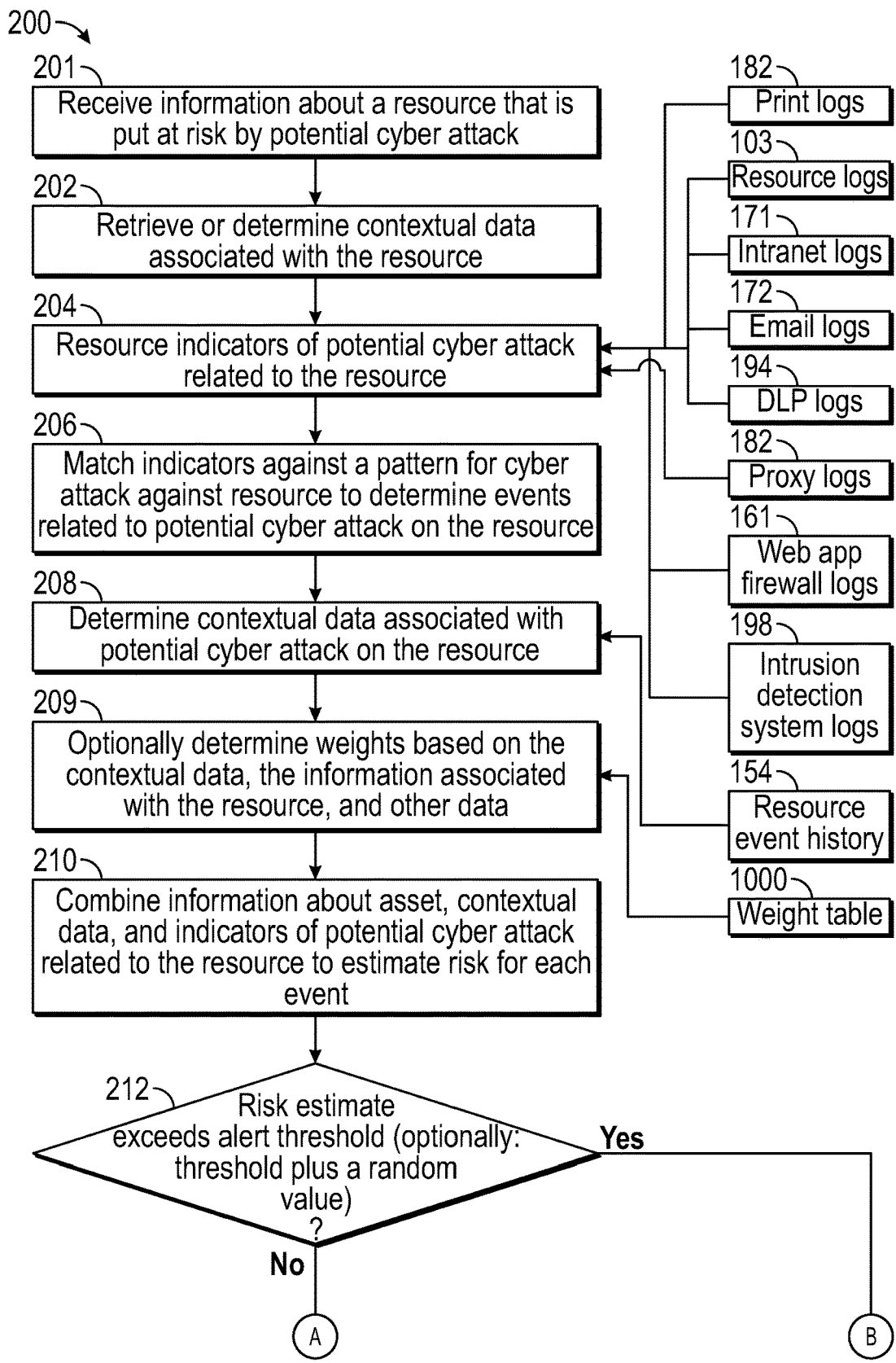
FIG. 2 is a flow chart showing an example method of alert creation, according to an embodiment of the present disclosure.
Figure 2:
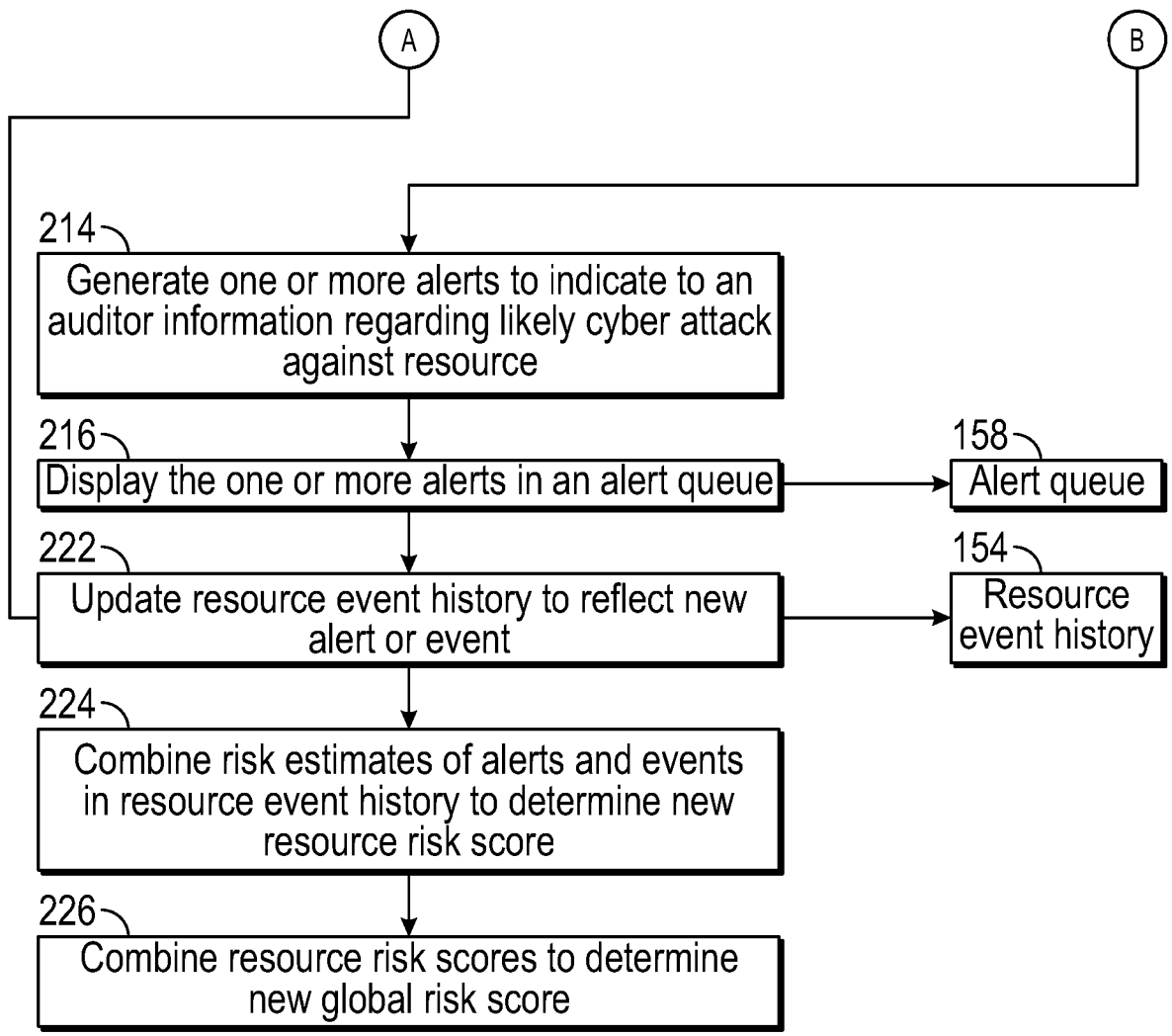

FIG. 2 is a flowchart of an example method 200 of alert generation, according to an embodiment of the present disclosure. In various embodiments, fewer blocks or additional blocks may be included in the process of FIG. 2, or various blocks may be performed in an order different from that shown in the figure. In various implementations, the blocks of FIG. 2 may be performed serially and/or concurrently, and may be performed multiple times simultaneously. Further, one or more blocks in the figure may be performed by various components of the warning system, for example, monitoring device 150 (described above in reference to FIG. 1).

At block 201 the warning system begins its analysis by accessing information about a resource that is potentially at risk from cyber attack. The information about different resources may, in some embodiments, be provided to the warning system during deployment and may comprise, for example, the name of the resource, the servers, databases and other computer resources associated with the resource, and other information about the resource. In some embodiments, the warning system may utilize machine-learning techniques to automatically determine which resources, activity and other observable variables are related to which resource. For example, the warning system may observe traffic patterns, user activity, past indicators and alerts, and other information, and apply supervised learning techniques known in the art, such as support vector machines, to those observations. This may allow the warning system to determine, based on an initial classification of certain resources and activities as part of a resource, other resources and activities that are likely related to that resource. Advantageously, this allows the warning system to automatically adapt to changes in network topology and configuration, and reduces the administrative effort required. At block 202 the warning system accesses contextual data associated with the resource that is put at risk by a potential cyber attack. For example, the contextual data may include information about what users are permitted to access the resource, information about ordinary transaction patterns, or information about typical usage patterns of the resource by authorized users. The information may also include the physical location of the resource, the location of the resource within the organization's network topology, the value of the resource etc. At block 204, the warning system accesses indicators of a potential cyber attack related to the resource. Examples of such indicators include proxy logs 182, email logs 172, data loss prevention logs 194, application firewall logs 161, etc. The warning system may, for example, access the indicators by querying other devices through an network management protocol such as SNMP, gather the information from accessing the file system of a remote device and parsing its log files or by processing other types of records, such as packet captures from a firewall, logs from an intrusion detection system, anti-malware system, gateway or router. In an embodiment, the warning system may copy some or all of the indicators accessed into local storage to facilitate faster analysis. At block 206 the warning system matches the indicators accessed in block 204 against a set of rules that correspond to different types of activity potentially related to a cyber attack against a resource to determine a set of events reflecting such activity. For each event, the warning system may determine information related to the event based on the rules; for example, the warning system may extract time, date, users, servers and IP addresses involved, etc. The rules may be specifically written for the organization, or the resource, or they may be generic rules representing activity that is generally indicative of a cyber attack. In an embodiment, an analyst may, even after the system has been deployed and is in operation, be able to define arbitrary rules to process information gathered from available data sources, such log files. For example, an analyst may define rules that capture certain business-specific activity. In an embodiment, rules may be automatically learned from activity related to a resource that was previously determined to be related, or not related, to a cyber attack. For example, the warning system may extract various features, such as IP addresses, ports, signatures, packet headers and other characteristics, from past alerts that were determined by an analyst to be related to a cyber attack on a resource, or that were determined by an analyst not to be related to such an attack. Based on machine-learning methods known in the art, such as supervised learning using support-vector machines, the warning system may, from these features, infer a set of rules that can be applied to determine a set of indicators relevant for detecting future attacks.

For example, indicators from an email server may be matched against a set of rules to determine indicators related to emails that were sent to a recipient inside the organization and that appear to be social engineering attacks against an employee of the organization. As another example, proxy logs 182 may be matched against a list of known malicious domains to determine connections made by malicious software from inside the organization to detect attempts of data exfiltration to such known malicious domains. In another example, firewall logs 161 and intranet logs 171 may be matched against rules matching common probing or exploitation techniques. In yet another example, data loss prevention logs 194 may be matched against rules to determine indicators related to attempts of data exfiltration.

In block 208, contextual data associated with the events potentially related to a cyber attack on the resource is determined. For example, in an embodiment the resource event history 154 may be queried to determine whether similar events related to a potential cyber attack on the resource have occurred in the past, and if so, whether those were determined by an analyst to be false positives or genuine causes for concern. As another example, some of the contextual data associated with a potential cyber attack on the resource may include information about events related to potential cyber attacks on other resources.

At block 209, weights may optionally be determined based on the contextual data associated with a potential cyber attack on the resource as determined in block 208, the data associated with the resource is determined in block 201, and other data. In an example embodiment, a weight table 1000 may be used to determine appropriate weights.

In block 210 the information about the resource, the contextual data associated with the resource and the indicators of a potential cyber attack related to the resource as determined in block 204 are combined to determine, for each event, a risk estimate that indicates how much the resource is being put at risk by the event. In block 212 the risk estimate as determined in block 210 is compared against a threshold or in an alternative embodiment is compared against a threshold plus a random value. If the risk estimate exceeds the threshold or the threshold plus the random value control passes to block 214 wherein an alert is generated to indicate to an analyst information regarding a probably cyber attack against the resource. For example, the alert may comprise information about the time and date that the suspicious activity occurred, what resource is being put at risk, what users, what servers and what type of services are involved in the suspicious activity, and what the estimated risk is. In block 216 the one or more alerts as generated in block 214 are submitted into an alert queue 158 from where they can be presented to an analyst. Alert queue 158 can, but need not necessarily be implemented as a sequential queue, such as a First-in-First-out data structure. Alert queue 158 may also be implemented as a list within an application from which alerts can be retrieved in any order (e.g. random order). Examples of how, in an example embodiment, the alerts can be displayed are illustrated below with reference to FIGS. 6 to 9.

In block 222, the resource event history 154 is updated to reflect the new alert or the new event, whatever the case may be. For example, block 222 may comprise the warning system accessing a database storing all events and alerts for a given resource and inserting a record indicating the new event or alert, the date and time of occurrence, the risk estimate and other contextual data that may have been accessed during one of the preceding steps as illustrated in FIG. 2. In block 224, the combined risk estimates of the alerts and events in the resource event history that have not yet been responded to by an auditor are being combined to determine a new risk score for the resource. Notably, even events that did not meet the risk threshold in block 212 and for which accordingly no alert has been issued may still be taken in consideration in block 224 when the resource risk score is being calculated. This reflects the observation that a potential cyber attack may occur without any particular event or indicator suggesting an extraordinarily high risk but a number of indicators or events viewed together suggesting that a potential cyber attack is in progress. In an example embodiment the resource risk score is a numeric value that can go from 0 to 100. In an example embodiment, a monotonically converging mathematical function is being used to combine the individual risk estimates so that the risk score increases with each additional alert and event but still never exceeds a given value, such as 100, or falls below zero. In block 226 the global risk score is updated based on the resource risk scores as determined in 224. The global risk score may be determined by combining the resource risk scores using a similar mathematical function as was used to determine the resource risk score in step 224. In an example embodiment the global risk score is again a value between zero and 100. In an example embodiment, the global risk score may be displayed prominently on the first page presented when an analyst accesses the user interface of the warning system, thus immediately conferring an overview of the security posture of the organization. Simultaneously, resource risk scores of selected resources, such as resources contributing strongest to the global risk score, can be presented. By selecting an individual resource, the analyst may be directed to a page prominently displaying the resource risk score, together with information about individual alerts and events contributing to the resource risk score.

Example Method of Alert Presentation and Feedback

Figure 3:
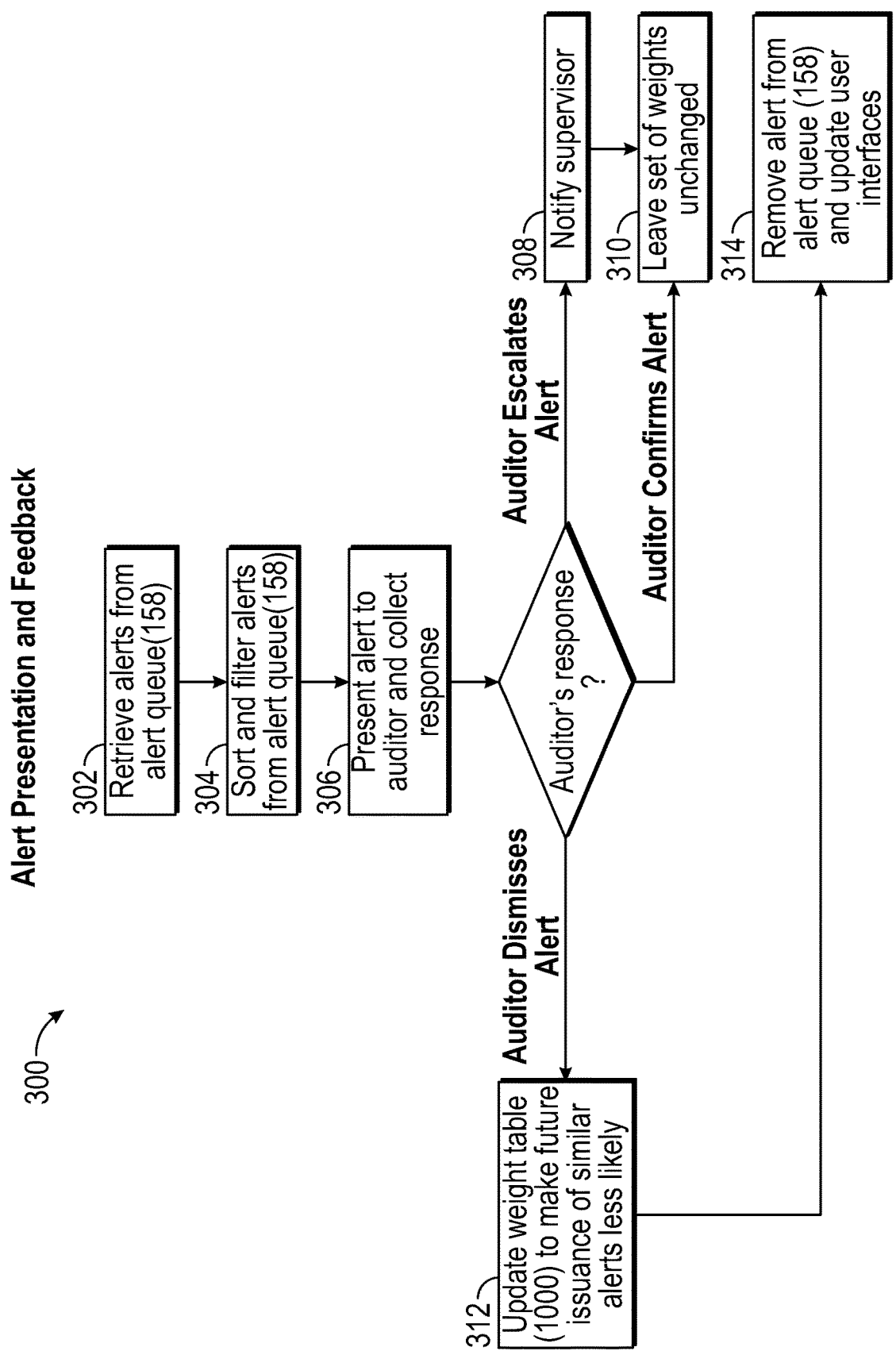
FIG. 3 is a flow chart illustrating an example method of alert presentation and feedback collection, according to an embodiment of the present disclosure.

FIG. 3 is a flowchart of an example method 300 of alert presentation and feedback, according to an embodiment of the present disclosure. In various embodiments, fewer blocks or additional blocks may be included in the process of FIG. 4, or various blocks may be performed in an order different from that shown in the figure. In various implementations, the blocks of FIG. 3 may be performed serially and/or concurrently, and may be performed multiple times simultaneously. Further, one or more blocks in the figure may be performed by various components of the warning system, for example, monitoring device 150 (described above in reference to FIG. 1).

At block 302, one or more alerts are retrieved from the alert queue 158. At block 304, the one or more alerts retrieved from the alert queue 158 are grouped, filtered and sorted. The alerts may dynamically be grouped and filtered, for example according to different alert types. In an embodiment, the alerts may be sorted by the risk score, for example so as to show the alerts starting with the highest risk score.

At block 306, the alerts, as grouped and filtered, are displayed to the analyst in one or more interactive user interfaces (e.g., as described below in reference to FIGS. 5-9), and a response is received from the analyst. Information or interactive representations associated with the alerts, or the associated indicators may be presented within a user interface that is presented to the analyst, as described below. For example, the representations may provide visual indications (e.g., graphs or other visualizations) of the indicators related to the alerts and/or groups of alerts. A web server or other type of user interface engine may be configured and/or designed to generate user interface data useable for rendering the interactive user interfaces described herein, such as an application and/or a dynamic web page displayed within the analyst's device 153. In various embodiments the user interface data may be transmitted to the analyst's device 153, and/or any other computing device, such that the example user interfaces are displayed to the analyst (and/or other users of the warning system). According to an embodiment, analysts may also assign tasks to themselves or one another via a user interface. Auditors may choose to respond to alerts in a variety of ways, for example by dismissing the alert (e.g., indicating that it was issued in error), by escalating the alert to a supervisor, or by confirming the alert without escalating it to a supervisor.

The warning system moves on to one of blocks 308, 310, or 312 depending on the analyst's response. If the analyst chooses to dismiss the alert, the warning system will adjust the weight table 1000 to reflect the fact that it had issued an alert that should not have been issued. The warning system will thus reduce the weights of the indicators having contributed to the issuance of the alert and conversely increase those of indicators not having contributed to the alert. If the analyst chooses to confirm the alert, the warning system moves to block 310, leaving the set of weights unchanged, thus reflecting the analyst's determination that similar alerts should be issued in the future. If the analyst chooses to escalate the alert to a supervisor, the warning system moves to block 308, causing the alert to be presented to a supervisor. The alert may be presented to a supervisor in a similar manner as it was presented to the analyst, or it may be presented through email, text message or other form of communication. After the alert has been presented, the warning system moves to block 310, leaving the set of weights unchanged. After an alert has been responded to by an analyst, the warning system, in block 314, marks the alert as historic, indicating that no risk is associated with the alert any longer. When an alert is marked as historic, the warning system also recalculates the resource risk score and global risk score to reflect the removal of the alerts, and redraws any graphs or other visualizations comprising the removed alert or one of the updated risk scores.

Example Weight Table

FIG. 4 illustrates an example weight table 400 according to an embodiment of the present disclosure. The weight table comprises a number of weights stored in a row-column format. Each column in the columns 402 corresponds to a resource. Different resources may be, as illustrated, a stock trading system, a tax return database, or a nuclear centrifuge controls system. In the rows 410, each row corresponds to an indicator. For example, there may be a row for a server that is part of the resource showing repeated authentication failures, or a row for a computer belong to the resource's administrative user having been infected with malware.

At each intersection of a row and a column is a table element that corresponds to the weight of the indicator in its row, as related to the resource indicated in its column. For example, example table element 420 corresponds to the weight of an indicator "virus infection of resource administrator's computer" for the stock trading system resource. Some indicators, as indicated by column range 414, may relate to risk posed to a specific resource; other indicators, such as indicated by column range 412, may relate to a more general type of threat, putting several resources or all resources at risk.

Based on the weight table, different events may be assigned different risk estimates based on the resource that they correspond to. In an embodiment, the weight table 400 can be updated by the warning system based on the analyst's response to an alert, so as to suppress future alerts that were determined to be false positives and increase the type of alerts being issued that were determined to be correct.

Example Auditor User Interfaces

FIGS. 5, 6, 7, 8 and 9, described below, illustrate methods and user interfaces of the warning system, according to various embodiments, in which indicators related to potential cyber attacks are automatically analyzed and, based on the analysis, alerts are automatically generated and presented to an analyst such that the analyst may quickly and efficiently evaluate the alerts and determine more accurately whether or not a cyber attack against an resource of the organization is in progress. In particular, as described below the warning system may apply one or more analysis criteria or rules to the indicators (e.g., processing indicators, including user activity information and contextual information) so as to generate a risk score and optionally an alert. The alert may be displayed in an analysis user interface through which the analyst may evaluate them and/or access more detailed data related to the alerts and related indicators. In an embodiment, one or more flags may be associated with each alert, and may be determined based on the indicators related to the alert.

As mentioned above, in an embodiment, the alert score may be binned into one of, for example, three bins corresponding to a high alert, a medium alert, or a low alert. Each alert level may be associated with an indicator, icon, color, and/or the like. For example, a high alert may be associated with red (and/or another color), a medium alert may be associated with orange (and/or another color), and a low alert may be associated grey (and/or another color).

In various embodiments of the example user interfaces described below in reference to FIGS. 5-9, various aspects of the user interfaces may or may not be included, may appear visually different, and/or may be arranged differently.

Figure 5:
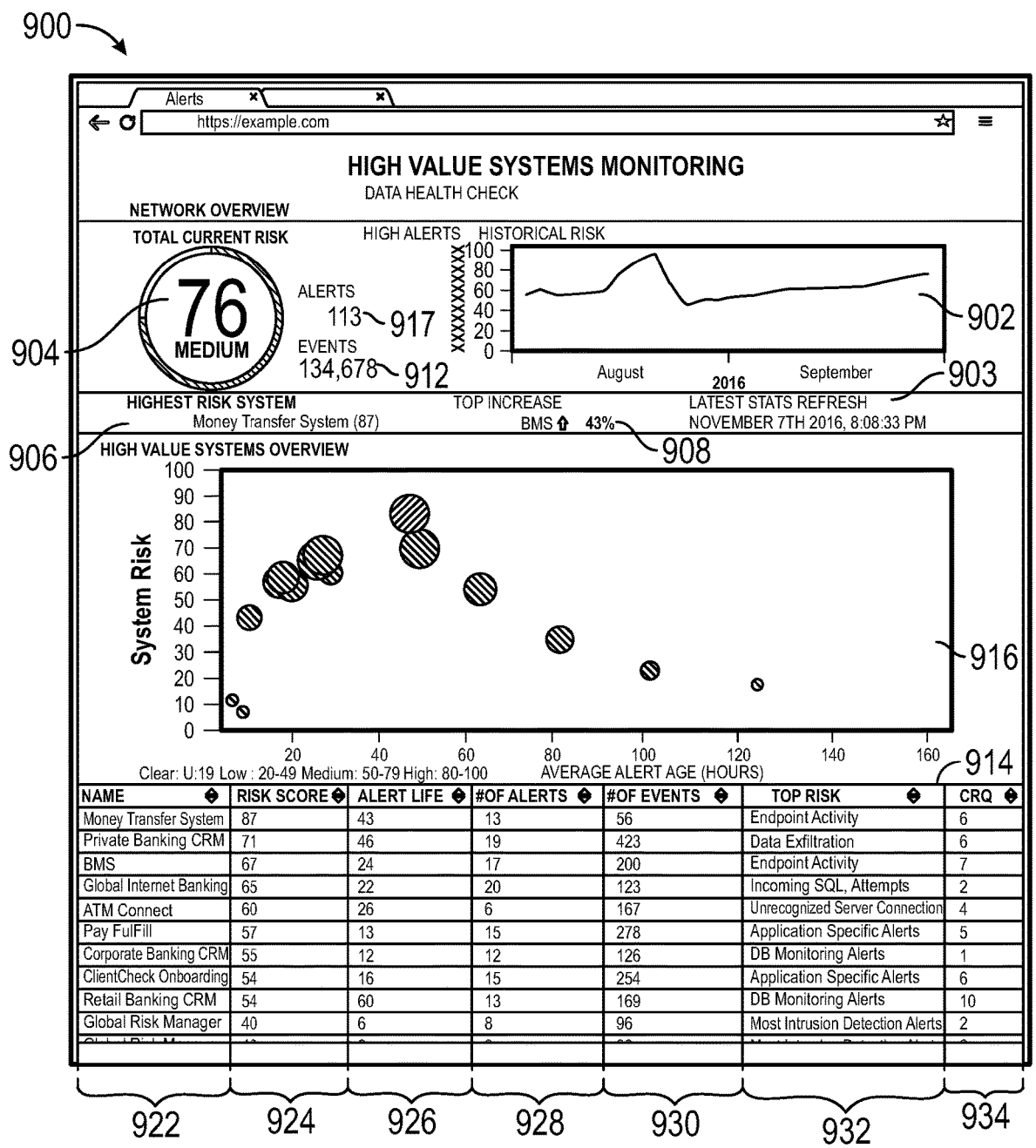
FIG. 5 illustrates an example cyber attack warning system user interface displaying an overview of the security posture of all resources.

Referring to FIG. 5, example user interface 900 illustrates a network overview provided by the warning system to an analyst to allow the analyst to review the risk level of all resources on the network that are being monitored by the warning system. Example user interface 900 includes a historical risk graph 902, a risk trend indicator 908, a system risk graph 916, a resource list 914, an event counter 912, a highest risk system indicator 906, an alert counter 917, a last refresh field 903, and a total risk score indicator 904. The resource list 914 comprises a resource name column 922, a risk score column 924, an alert life column 926, an alert count column 928, an event count column 930, a top risk indicator column 932, and a cyber risk quantifier column 934.

Figure 6:
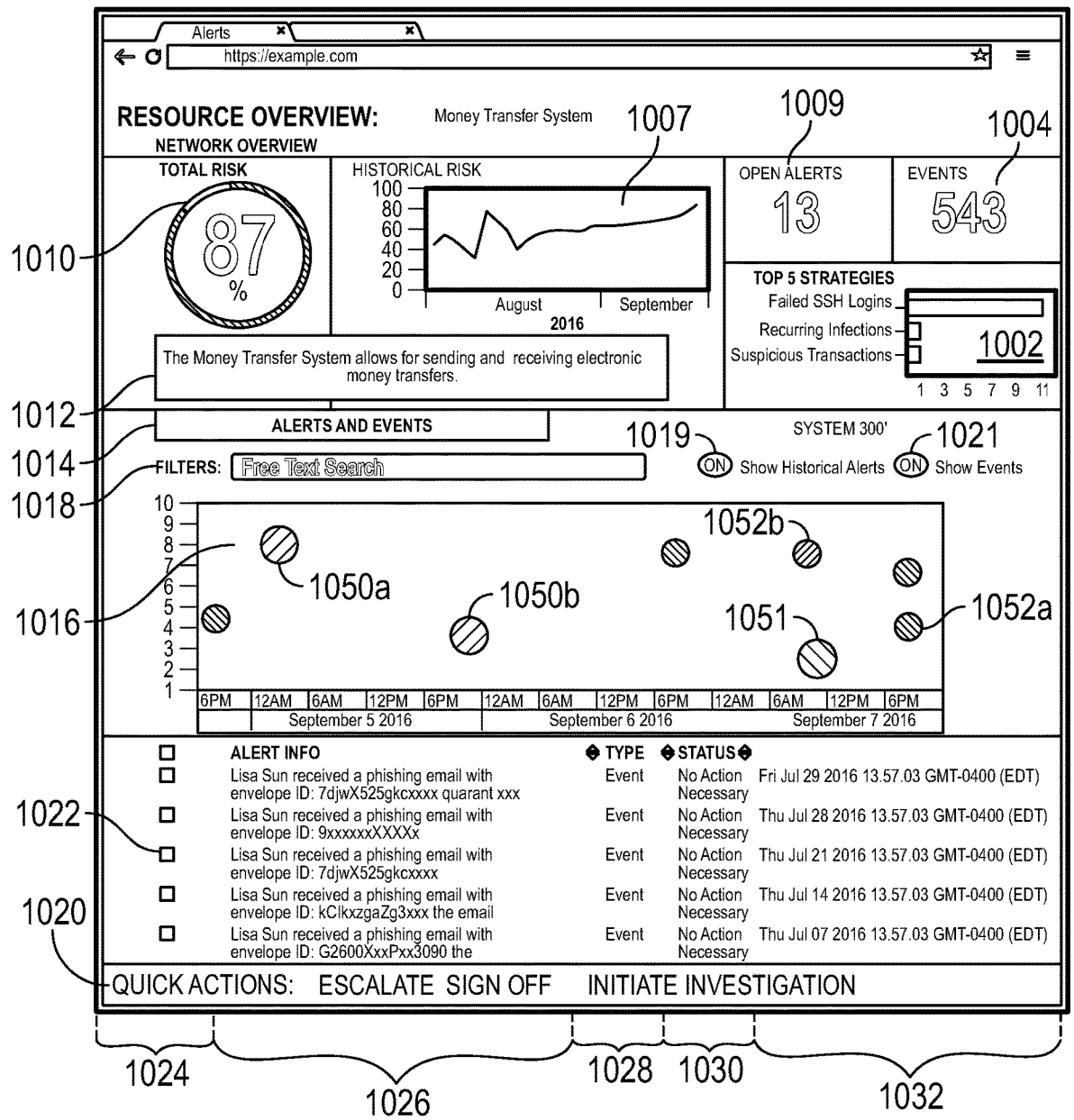
FIG. 6 illustrates an example warning system user interface displaying an information page comprising alerts and events related to a specific resource.

The historical risk graph 902 shows a graphical representation of the overall risk across all resources monitored by the warning system over time. For example, the historical risk graph 902 may show on the x-axis the last three months and on the y axis show the global risk score. The risk trend indicator 908 shows the resource that has been determined as having the greatest increase in risk over a recent period of time, such as for example, the last twenty-four hours. The highest risk system indicator 906 shows the resource with the highest risk score, and the risk score corresponding to that resource, in parentheses. By selecting the highest risk system indicator, the analyst is directed to a system overview page of the highest risk system, as illustrated in FIG. 6. The last refresh label 903 indicates the last time that the data shown in the user interface 900 has been updated. The total risk score indicator 904 shows the global risk score as well as a graphical representation of that risk score and a categorization of the risk level such as, for example, medium. The alert counter 917 shows how many alerts are currently in the warning system that have not yet been responded to by an analyst. The event counter 912 shows how many events the warning system is currently keeping track of. The system risk graph 916 shows a representation of the average age of an alert versus the system risk as determined by the resource risk score. This may allow an analyst to see which systems are at risk, and whether the risk is coming from the resource having a backlog of old alerts that have not been responded to, or whether the risk is caused by recent alerts. The resource list 914 shows information about each of the various systems monitored by the warning system. For example, resource name column 922 shows the name of the resource. Risk score column 924 shows the risk score corresponding to the resource. Alert life column 926 shows the average time from the issuance of an alert to an analyst's response to the alert. The alert count column 928 indicates the total number of open alerts for each resource. The event count column 930 indicates the total number of events for each system. The top risk indicator column 932 indicates the type of event or alert that is associated with the highest overall contribution to the risk score. The cyber risk quantifier column 934 indicates, a numerical estimate of the cyber risk, e.g. the inherent exploitation vulnerability of the software related to the resource in question. This may be determined by an empirical or theoretical estimate of the exploitation vulnerability of the underlying software of the resource. This may, for example, be calculated by taking into consideration a historical average of vulnerabilities found, or by theoretically estimating vulnerability to exploitation (e.g. software running on an operating system with more sophisticated anti-exploitation techniques, such as address space layout randomization, may be assigned a lower cyber risk than software running on an operating system not incorporating such techniques).

Example user interface 1008 as shown in FIG. 6, illustrates an resource overview provided by the warning system to an analyst to allow the analyst to review information, including alerts and events, related to a potential cyber attack, against a chosen resource being monitored by the warning system. Example user interface 1008 comprises an resource risk indicator 1010, an event counter 1004, a top strategies pane 1002, an resource description field 1012, a column selector 1014, an alerts and events filter field 1018, an alert and event graph 1016, an alerts and events table 1022, and a quick action bar 1020. The historical risk graph 1007 illustrates a graphical representation of the estimated risk of the selected resource over time.

The top strategies pane 1002 shows the types of activities or indicators monitored that recently generated the most events related to this resource. Advantageously, this allows the analyst to determine whether or not there is a trend of a certain suspicious activity increasing in volume, and whether or not the sources of alerts are concentrated. The open alerts counter 1009 indicates the number of alerts currently requiring a response from the analyst. The alerts and events filter field 1018 accepts text input from the analyst and allows him to filter the alerts and events being displayed. For example, the analyst may enter the name of a specific user or may enter the type of a specific suspicious activity such as authentication failure to filter the alerts displayed. Advantageously, this allows the analyst to investigate certain types of activity related to a cyber attack against a resource in greater detail. The quick action bar 1020 allows the analyst to select one out of several responses to the selected one or more alerts. For example, the analyst may be able to escalate the one or more alerts to a supervisor by selecting the escalate option, the analyst may dismiss the one or more alerts as non-critical by clicking the sign-off option, the analyst may be able to assign another analyst to conduct an investigation by clicking the initiate investigation option.

The alert and event graph 1016 displays a graphical representation of alerts and events for the resource; displays alerts and events based on their occurrence in time and their risk score. For example, alerts 1052*a* and 1052*b* are drawn in the chart with their positions representing their time of occurrence and risk score. The show historical alerts toggle switch 1019 allows the analyst, by selecting and deselecting it, to determine whether or not historical alerts, that is, alerts that have already been responded to by an analyst, should be displayed in the alert and event graph 1016. The show events toggle switch 1021 allows the analyst by enabling or disabling it to determine whether or not events should be displayed in the alert and event graph 1016. If the display of historical alerts is selected through the show historical alerts toggle switch 1019 historical events may be displayed in the alert and event graph 1016 as striped circles (or as any other indicator, icon, or color, for example), such as for historical event 1051. If the display of events is enabled in the show events toggle switch 1021, events are displayed as shaded grey circles (or as any other indicator, icon, or color, for example) in the alert and event graph 1016, such as for events 1050*a* and 1050*b*.

The alerts and events table 1022 comprises, for each event displayed in the alerts and events table 1022, a selection check box 1024, an alert or event description column 1026, alert or event type column 1028, and a status column 1030 as well as an alert or event time column 1032. The selection check box 1024 allows the analyst to include in a selection by checking, or to exclude from a selection by unchecking, the selection check box 1024, corresponding one or more alerts. This allows the analyst to choose one or more alerts to take action on. For example, the analyst may check the selection check box 1024 corresponding to one or more alerts to either sign off, escalate, or initiate an investigation as to those one or more alerts.

The alert or event description column 1026 displays a concise summary of the type and nature of activity that gave rise to an alert or event. This may include alert-specific information, such as the name of a person, computer, server etc. Advantageously, this may allow a free-text search to pick up on those details across different alerts. For example, the alert or event description column 1026 may indicate that a certain user has unsuccessfully attempted to log into a computer resource of the organization that a certain user's computer has been determined to be infected with malicious software or that a certain user has been receiving social engineering emails, the name of the user, and the email address to which they were sent. The alert or event type column 1028 indicates whether a given entry in the alerts and events table 1022 is an alert or an event. The status column 1030 indicates whether or not for a given event any action by the analyst is expected by the warning system. For example, for an event the status column will indicate that there is no action necessary by the analyst, whereas for an alert the status column 1030 may indicate that action by the analyst is requested for an alert. For example, the analyst may be requested to review and, as appropriate, decide to either escalate, sign off or initiate an investigation as to the alert. If an analyst has taken an action as to an alert, the status will change, indicating that no further action is necessary anymore because the alert has already been signed off, escalated or subjected to the initiation of an investigation by this or another analyst. The alert or event time column 1032 indicates the date and time that the alert or event was created.

Advantageously, by presenting to the analyst alerts together with events, as in the example user interface of FIG. 6, the analyst may be more effective in reviewing the alerts. The analyst has access both to alerts that have already been determined by the warning system to be significant risks, as well as to events that have been determined by the warning system to as such not pose substantial risk, but could still be valuable to understand the context, and determine the cause or nature of other suspicious activity presently occurring against the resource. The event counter 1004 indicates the total number of events that the warning system is currently keeping track of with regards to this resource. The open alerts counter 1009 indicates the total number of alerts that are currently open with respect to this resource. The resource description field 1012 contains a short description of the nature and use of the resource.

Escalating one or more alerts notifies a supervisor of the alerts, thus allowing the supervisor to take immediate action against a cyber attack. Selecting "Initiate Investigation" allows the analyst to assign another analyst to investigating the selected one or more alerts. Signing off on one or more alerts reflects the analyst's determination that the alert does not necessitate action. This causes the warning system to mark the selected alert as historic; the selected one or more alerts will thus no longer contribute to the resource risk score. Once an alert is marked as historic, the warning system updates the resource risk score and global risk score to reflect the removal of the alert. If the historic alerts toggle switch is set to disabled, the selected one or more alerts will also be removed from the alert and event graph 1016; otherwise, the alerts will remain on the alert and event graph 1016, but be drawn there as shaded black circle (or as any other indicator, icon, or color, for example). Other elements of the user interface, including the event counter 1004, will also be updated to reflect the removal of the alert.

Figure 7:
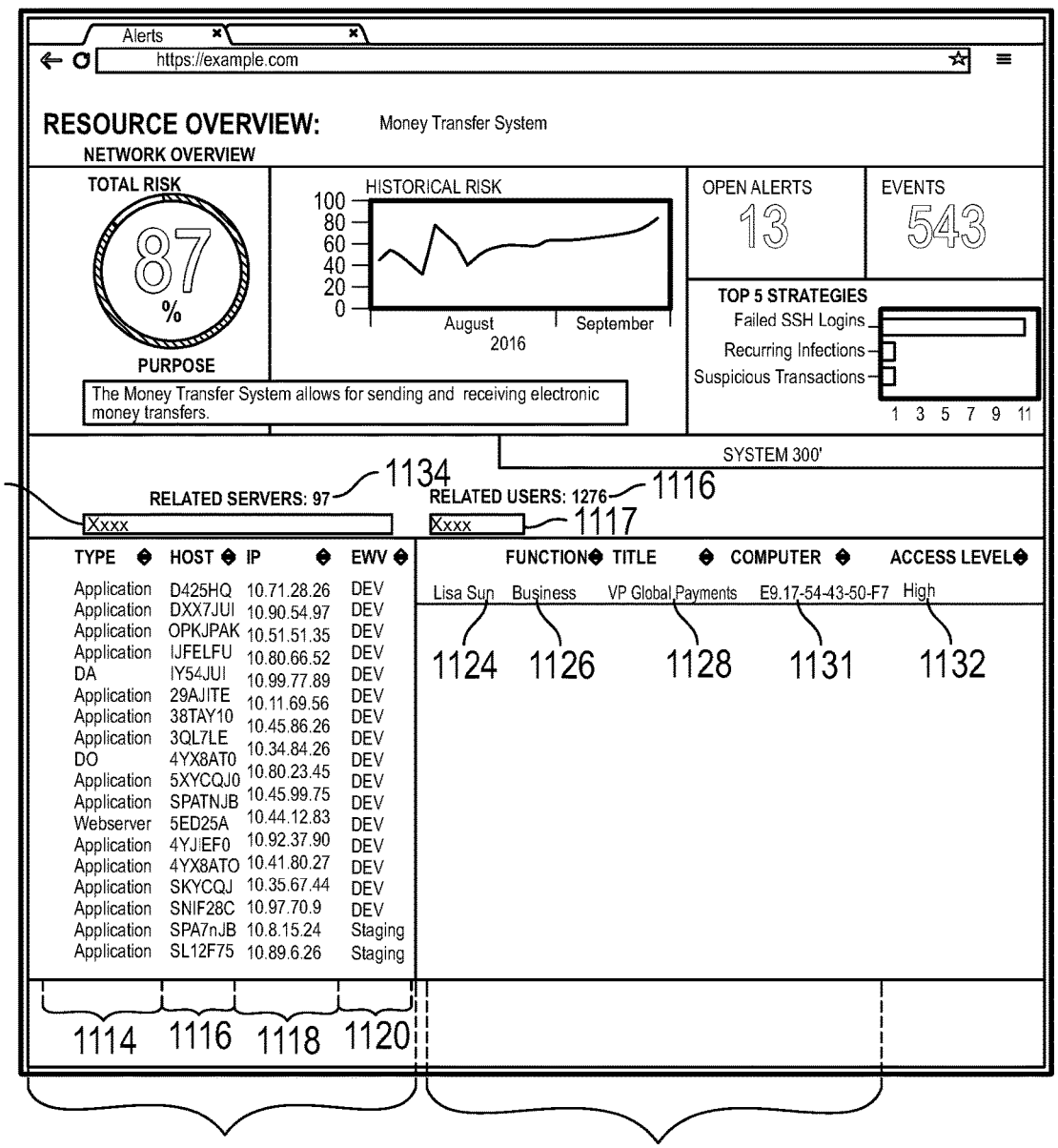
FIG. 7 illustrates an example warning system user interface displaying an information page comprising users and resources related to a specific resource.

FIG. 7 illustrates an example user interface 1100 of the warning system in which a view of the servers, services, applications, databases and other resources that are associated with a given resource, as well as a list of users associated with a given resource, are presented. Specifically, in the related servers table 1112, information is being displayed about what computer resources are associated with a given resource. In the type column 1114, the type of the computer resource such as an application, a database, a webserver, another type of server or other type of resource is identified. In the host column 1116, the name of the host on which the resource is located is identified. In the IP column 1118, the internet protocol (IP) address of the host associated with the given resource is identified. In the environment column 1120, the environment of the given resource such as for example whether it is a production server or a testing server is identified. In the related resources label 1134, the number of related resources currently being tracked by the warning system is identified. In the related users pane 1130, information about users associated with the resource is being presented. In the user name column 1124, the name of the user is presented. In the function column 1126, the role of the user is being presented. In the title column 1128, the job title of the user is being presented. In the computer column 1131 information about the user's computer such as, for example, the hardware address of the computer, is being presented. In the access level column, 1132 the access level of the user such as, for example, whether the user has administrative privilege or merely normal user privileges is indicated. The server filter field 1135 allows the analyst to enter a string of characters, thereby causing the warning system to filter the related servers table 1112 so as to only display those servers where at least one of the attributes matches the entered string of characters. In the related users label 1116, the number of users currently tracked by the warning system and related to the resource is identified. The related user filter field 1117 allows the analyst to enter a string of characters, thereby causing the warning system to filter the list of users so as to only display those users wherein at least of the attributes matches the string of characters entered in the related user filter field 1117. FIG. 11 illustrates an example user interface 1100 of the warning system in which 360° view of a selected resource is presented.

Figure 8:
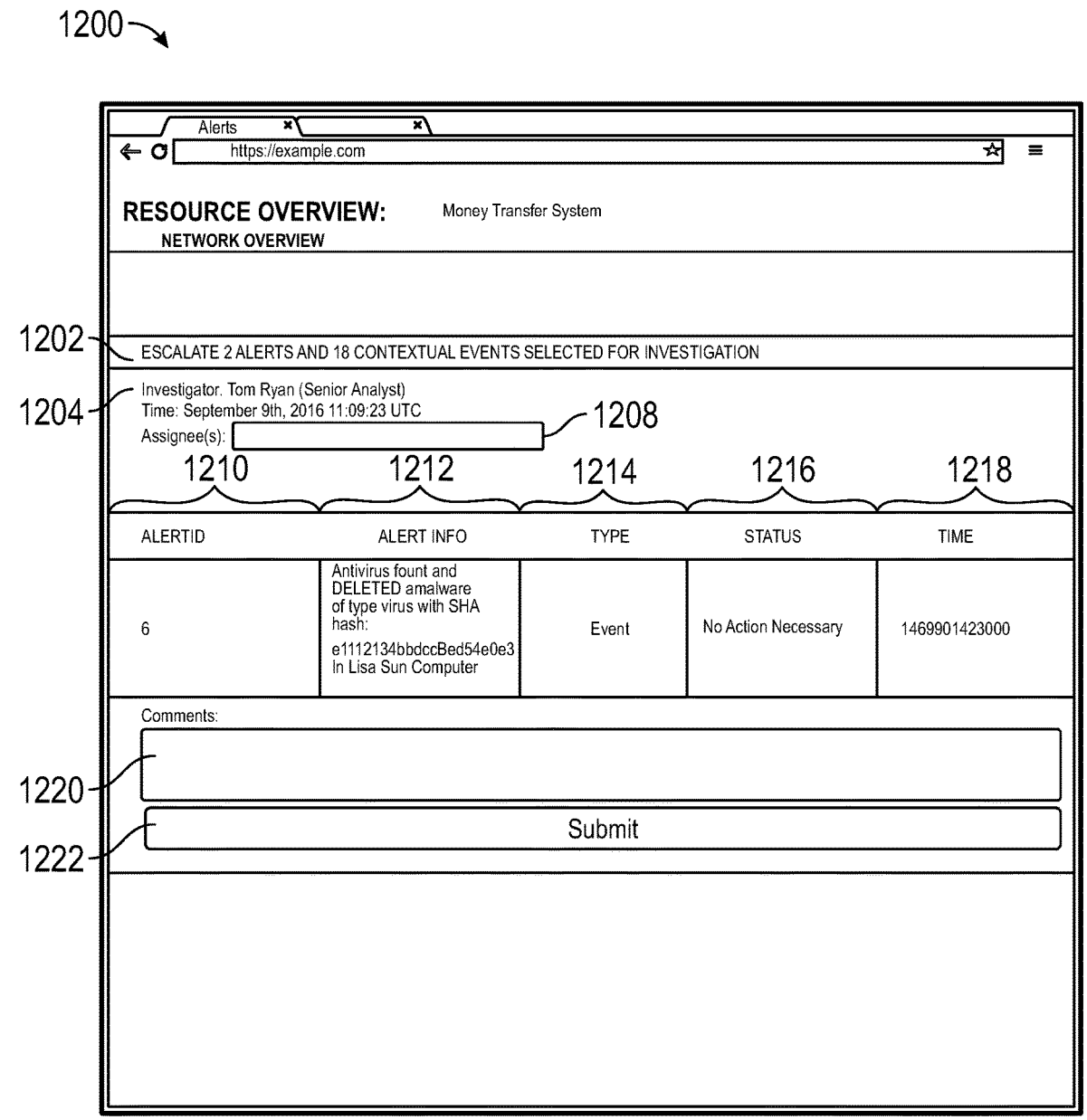
FIG. 8 illustrates an example warning system user interface presenting a prompt for an analyst to take action on selected events and alerts.

FIG. 8 illustrates an example user interface 1200 in which an analyst is presented with an escalate prompt, allowing the analyst to escalate events and alerts, for example alerts and events that were selected in a user interface 1008, as illustrated in FIG. 6. The escalate prompt comprises a title bar 1202, the investigator name field 1204, the time field 1206, the assignee field 1208, the alert ID column 1201, the alert intro column 1212, the alert type column 1214, the alert status column 1216 and the alert time column 1218, as well as the common field 1220 and the submit button 1222. The title bar indicates the number of alerts, and the number of events, that will be escalated if the analyst proceeds. The investigator name field 1204 shows the identity of the analyst to whom the alerts and events will be escalated absent a contrary choice by the analyst. The time field 1206 shows the time that the alerts or events will be escalated. The assignee column 1208 allows the analyst escalating the alert to specify one or more analysts to who the alert should be escalated to, thus overriding the default assignee in 1208. The alert ID column 1210 shows, for each alert, a unique numerical identifier that can identify the alert inside the warning system. The alert info column 1212 shows, for each alert or event, a short description of the factual circumstances leading to the issuance of the alert. For example, the alert or event info column may contain a description that the alert was issued in response to a malware infection of a computer, indicate the type of malware that was found and indicate whether or not the malware infection was successfully purged. The type column 1214 indicates whether the entry is an event or an alert. The status column 1216 indicates whether or not warning system is requesting some type of action related to the alert or event by the auditor, or whether no such action is necessary. The time column 1218 indicates the time that the alert or event was issued. The comments box 1220 allows the analyst to add information such as the description or an annotation that will be visible to the assignee and to other analysts when reviewing the alert. The submit button 1222, when selected, allows the analyst to confirm escalating the alert to the assignee specified in the assignee field 1208. Upon being selected, the warning system updates its records to cause the alerts and events to be escalated as requested, and, if successful, shows a confirmation to the analyst, for example in a user interface 1300 as illustrated in FIG. 9.

Figure 9:
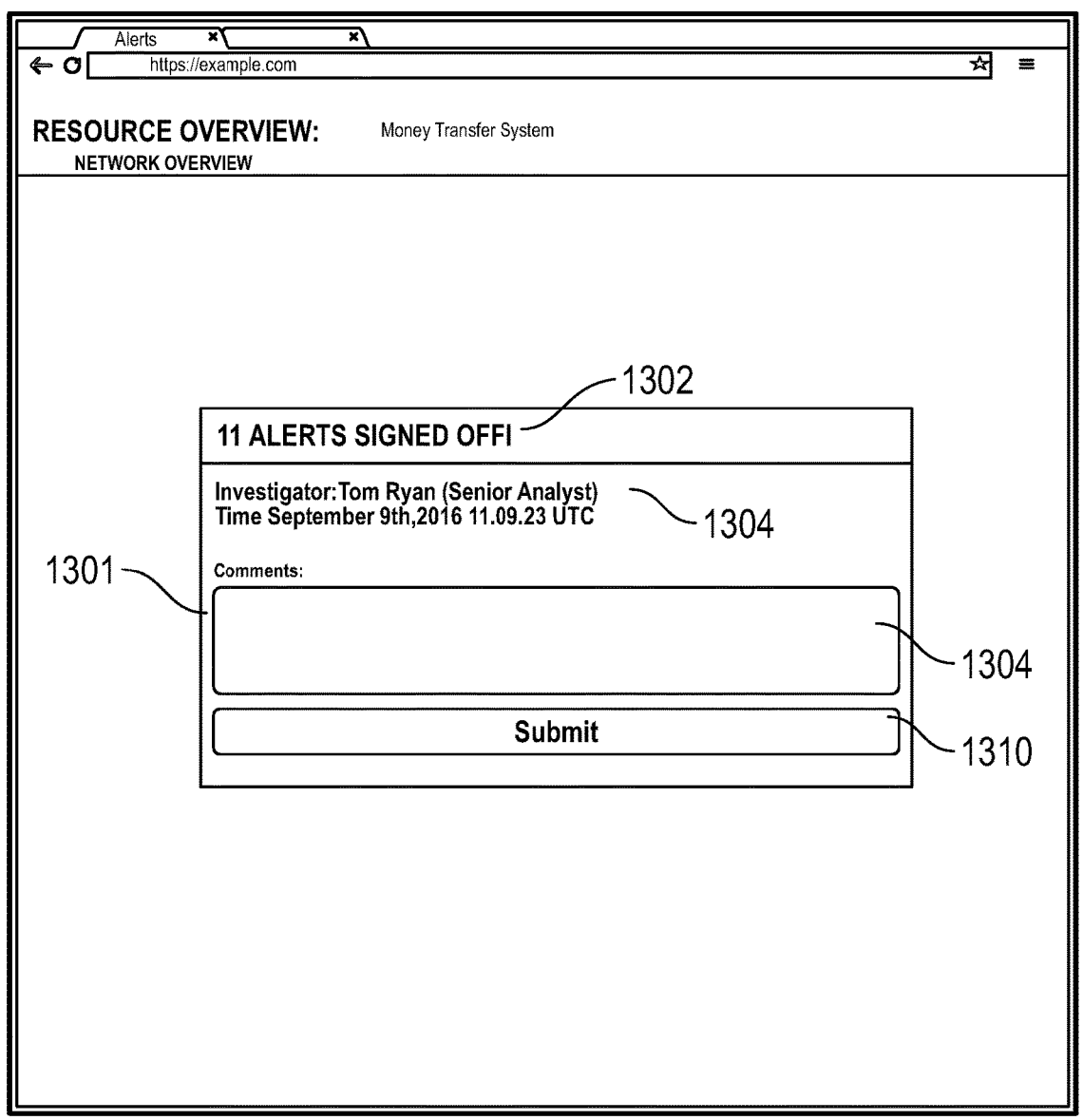
FIG. 9 illustrates an example warning system user interface presenting a confirmation page for an analyst having signed off on an alert.

FIG. 9 illustrates an example user interface 1300, showing a confirmation message 1301 confirming to an analyst that the warning system has received the analyst's action on an alert or event, for example that an alert has been signed off, and additionally allows the analyst to provide additional information related to the alert. Confirmation message label 1302 indicates to the analyst the number of alerts or events that action was taken on. An analyst may also add comments via a comment box 1304 that will be shown to others reviewing that alert, including, for example, other analysts or supervisors. Specifically, an analyst may use the feedback box to include information related to the user's activity when escalating an alert, thus facilitating that a supervisor reviewing the escalated alert or another analyst investigating an alert is presented with the contextual information as provided by the warning system as well as any remarks or annotations by the analyst having already reviewed the alert. Advantageously, this may allow for more effective information sharing and thus easier collaboration between analysts. The submit button 1310, when selected, allows the analyst to submit any commentary entered into the comment box 1304, dismiss the confirmation message 1301, and return to the previous user interface.

In various implementations, various tables and panels may include more or fewer columns or information items than those shown in the examples of FIGS. 5, 6, 7, 8, and 9. Further, the user may optionally select any portion of each row to view more detailed information associated with an alert. In an implementation, each alert or event may include additional user interface elements by which an analyst may take an action with respect to the alert (e.g., escalate, dismiss, confirm, etc.)

Additional Implementation Details and Embodiments

Distinguishing non-activity related to a cyber attack against an resource on a computer network from activity related to a cyber attack on an resource is difficult, especially because of the large quantity of indicators to be reviewed, and because it may not be possible to conclude whether a certain event is or is not indicative of a cyber attack by taking into account only one, or a subset of, indicators. Embodiments of the present disclosure allow for a warning system to be implemented that gathers the various indicators, processes them using contextual information to determine the risk of a cyber attack against a resource, and generates alerts where appropriate based on the estimate of risk. The risk estimate can then be used to create alerts for review by a human analyst, and to sort, rank, aggregate and filter the alerts. When alerts are presented to a human analyst, contextual information, such as other events associated with the resource, is presented with the alert. Where appropriate, alerts may be presented using aggregates such as totals, averages, and maxima. Alerts are presented in a user interface that incorporates visual representations, such as charts and graphs, where appropriate, to allow the analyst to comfortably review large datasets and to take advantage of humans' particularly strong pattern recognition abilities related to visual stimuli.

In some embodiments, notifications of new alerts, or of other developments, such as a risk score exceeding a critical value, can be generated and automatically transmitted to a device operated by the user associated with a corresponding trigger. The notification and/or notification can be transmitted at the time that the notification is generated or at some determined time after generation of the notification and/or notification. When received by the device, the notification and/or notification can cause the device to display the notification and/or notification via the activation of an application on the device (e.g., a browser, a mobile application, etc.). For example, receipt of the notification and/or notification may automatically activate an application on the device, such as a messaging application (e.g., SMS or MMS messaging application), a standalone application (e.g., a warning system monitoring application), or a browser, for example, and display information included in the notification or additional related information. If the device is offline when the notification and/or notifications are transmitted, the application may be automatically activated when the device is online such that the notification and/or notification are displayed. As another example, receipt of the notification and/or notification may cause a browser to open and be redirected to a login page generated by the warning system so that the user can log in to the warning system and view the notification and related data. Alternatively, the notification and/or notification may include a URL of a webpage (or other online information) associated with the notification, such that when the device (e.g., a mobile device) receives the notification, a browser (or other application) is automatically activated and the URL included in the notification and/or notification is accessed via the Internet. Advantageously, this keeps analysts and other interested members of an organization informed about critical development, without requiring them to periodically check the status of the warning system.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
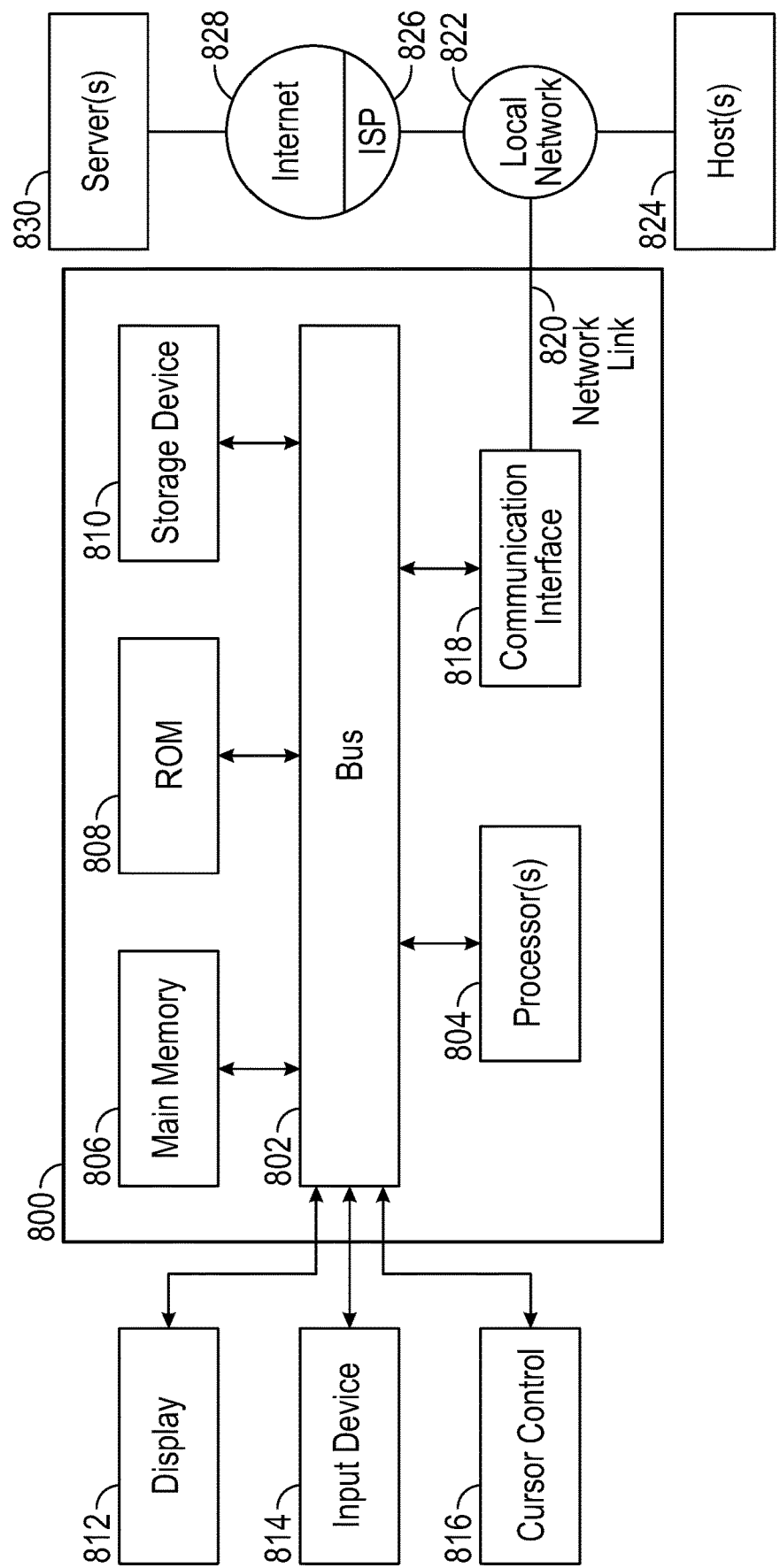
FIG. 10 illustrates an example computer system with which certain methods discussed herein may be implemented.

For example, FIG. 10 is a block diagram that illustrates a computer system 800 upon which various embodiments may be implemented. For example, monitoring device 150 may be implemented by provisioning computer system 800 with appropriate software instructions. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors. Because monitoring device 150, in some embodiments, is required to process substantial amounts of network activity in near real-time, multiple processors, or processors with multiple physical cores, and appropriate clock speeds may be necessary, depending on the volume of activity in the monitored network environment. When configured as monitoring device 150, computer system 800 may advantageously leverage parallel processing, particularly during the processing of indicators and events, and thus achieve significant performance benefits by utilizing multiple processors or physical cores.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions. Advantageously, computer system 800 may, when configured as monitoring device 150, utilize non-uniform memory access (NUMA) architectures for performance benefits. For example, computer system 800 may designate different processors or physical processor cores to a different resource or group of resources, and may store the corresponding indicators, rules and events in a memory location "near" that processor or physical core. This allows the warning system to concentrate memory accesses on "near" memory locations during the processing of indicators, and thus allows to further gain performance benefits from parallelism.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets). In an example embodiment, when configured as monitoring device 150, computer system 800 hosts a web server serving an HTML-based user interface to analysts connecting through a remote device.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to generate an alert related to a cyber attack against an resource of an organization, the computing system comprising:
a computer readable storage medium having program instructions embodied therewith; and
one or more processors configured to execute the program instructions to cause the one or more processors to:
receive contextual information about a resource, wherein the contextual information comprises at least one of: information about what users are permitted to access the resource, information about ordinary hardware control request patterns, information about typical usage patterns of the resource by authorized user, an access policy of the resource, a physical location of the resource, a value of the resource, or a location of the resource in a network topology of a network of the organization;
receive a first plurality of indicators associated with an activity that is performed on a computer network of the organization;
select, based at least in part on the contextual information, one or more indicators from the first plurality of indicators;
match the one or more indicators against rules that correspond to different types of activity that are indicative of a cyber attack against the resource to form a set of events reflecting such activity;
determine, based at least in part on the contextual information, a set of weights, from a plurality of sets of weights, to apply to the set of events;
determine, based at least in part on the set of events, the set of weights, and the contextual information, a risk score for each event, wherein the risk score indicates a probability that the resource is at risk from the event of a cyber attack;
compare the risk score for an event, from the set of events, to a threshold value, wherein the threshold value is based at least in part on a random value; and
in response to the risk score satisfying the threshold value, generate an alert.

2. The computing system of claim 1, wherein the alert comprises information that at least partly indicates the contextual information that contributed to the risk score satisfying the threshold value.

3. The computing system of claim 1, wherein the one or more processors are further configured to execute the program instructions to cause the one or more processors to:
generate a plurality of alerts based on one or more indicators satisfying one or more threshold values; and
present the plurality of alerts to an analyst in an order that is at least partially determined by respective risk score of the plurality of alerts.

4. The computing system of claim 1, wherein the one or more processors are further configured to execute the program instructions to cause the one or more processors to:
cause the alert to be presented using a graphical user interface comprising a representation of the risk score of the resource.

5. The computing system of claim 4, wherein the graphical user interface further comprises a representation of a total risk score of a plurality of resources, wherein the total risk score is determined by combining the risk scores in the plurality of resources.

6. The computing system of claim 5, wherein the one or more processors are further configured to execute the program instructions to cause the one or more processors to combine the risk scores in the plurality of resources using a monotonically converging function.

7. The computing system of claim 5, wherein the one or more processors are further configured to execute the program instructions to cause the one or more processors to:
provide a record-keeping functionality, wherein one or more interactions between an analyst and the warning system are recorded.

8. The computing system of claim 5, wherein the one or more processors are further configured to execute the program instructions to cause the one or more processors to:
receive a commentary input from an analyst;
associate the input with one or more alerts; and
cause presentation of the input together with the one or more alerts.

9. The computing system of claim 1, wherein the one or more processors are further configured to execute the program instructions to cause the one or more processors to:
generate a plurality of alerts that is integrated into a chart or graph visualization.

10. The computing system of claim 9, wherein the one or more processors are further configured to execute the program instructions to cause the one or more processors to:
integrate into the chart or graph a plurality of events related to a potential cyber attack against the resource and for which no alert has been generated.

11. The computing system of claim 10, wherein the one or more processors are further configured to execute the program instructions to cause the one or more processors to further include into the chart or graph historical alerts that have previously been responded to by an analyst.

12. A method for generating an alert related to a cyber attack against an resource of an organization, the method comprising:
by one or more processors executing program instructions:
receiving contextual information about a resource, wherein the contextual information comprises at least one of: information about what users are permitted to access the resource, information about ordinary hardware control request patterns, information about typical usage patterns of the resource by authorized user, an access policy of the resource, a physical location of the resource, a value of the resource, or a location of the resource in a network topology of a network of the organization;
receiving a first plurality of indicators associated with an activity that is performed on a computer network of the organization;
selecting, based at least in part on the contextual information, one or more indicators from the first plurality of indicators;
matching the one or more indicators against rules that correspond to different types of activity that are indicative of a cyber attack against the resource to form a set of events reflecting such activity;
determining, based at least in part on the contextual information, a set of weights, from a plurality of sets of weights, to apply to the set of events;
determining, based at least in part on the set of events, the set of weights, and the contextual information, a risk score for each event, wherein the risk score indicates a probability that the resource is at risk from the event of a cyber attack;

comparing the risk score for an event, from the set of events, to a threshold value, wherein the threshold value is based at least in part on a random value; and in response to the risk score satisfying the threshold value, generating an alert.

13. The method of claim 12, wherein the alert comprises information that at least partly indicates the contextual information that contributed to the risk score satisfying the threshold value.

14. The method of claim 12, the method further comprising:

by the one or more processors executing program instructions:

receiving a commentary input from an analyst;

associating the input with one or more alerts; and causing presentation of the input together with the one or more alerts.

15. Non-transitory computer-readable storage comprising instructions for causing one or more computing devices to perform operations comprising:

receiving contextual information about a resource, wherein the contextual information comprises at least one of: information about what users are permitted to access the resource, information about ordinary hardware control request patterns, information about typical usage patterns of the resource by authorized user, an access policy of the resource, a physical location of the resource, a value of the resource, or a location of the resource in a network topology of a network of the organization;

receive a first plurality of indicators associated with an activity that is performed on a computer network of the organization;

selecting, based at least in part on the contextual information, one or more indicators from the first plurality of indicators;

matching the one or more indicators against rules that correspond to different types of activity that are indicative of a cyber attack against the resource to form a set of events reflecting such activity;

determining, based at least in part on the contextual information, a set of weights, from a plurality of sets of weights, to apply to the set of events;

determining, based at least in part on the set of events, the set of weights, and the contextual information, a risk score for each event, wherein the risk score indicates a probability that the resource is at risk from the event of a cyber attack;

comparing the risk score for an event, from the set of events, to a threshold value wherein the threshold value is determined at least in part randomly; and in response to the risk score satisfying the threshold value, generating an alert.

16. The non-transitory computer-readable storage of claim 15, wherein the alert comprises information that at least partly indicates the contextual information that contributed to the risk score satisfying the threshold value.

* * * * *